United States Patent
Noda

(10) Patent No.: US 7,889,359 B2
(45) Date of Patent: Feb. 15, 2011

(54) INFORMATION PROCESSING APPARATUS AND CONTROL METHOD THEREOF, AND PROGRAM

(75) Inventor: Akihiko Noda, Hino (JP)

(73) Assignee: Canon Kabushiki Kaisha, Tokyo (JP)

( * ) Notice: Subject to any disclaimer, the term of this patent is extended or adjusted under 35 U.S.C. 154(b) by 974 days.

(21) Appl. No.: 11/671,512

(22) Filed: Feb. 6, 2007

(65) Prior Publication Data
US 2007/0195349 A1  Aug. 23, 2007

(30) Foreign Application Priority Data
Feb. 20, 2006  (JP)  ............... 2006-043161

(51) Int. Cl.
G06K 15/00  (2006.01)
G06K 15/02  (2006.01)
G06T 11/00  (2006.01)
G06F 17/21  (2006.01)
G06F 17/27  (2006.01)

(52) U.S. Cl. .................. 358/1.11; 199/40; 345/467; 345/471; 715/269

(58) Field of Classification Search .......... 358/1.11; 199/40; 345/467, 472.3; 715/269
See application file for complete search history.

(56) References Cited

U.S. PATENT DOCUMENTS 5,687,386 A * 11/1997 Niimura .................. 715/264
7,038,794 B2 * 5/2006 Kurashina ................ 358/1.11
2003/0046314 A1 * 3/2003 Morooka .................. 707/500

FOREIGN PATENT DOCUMENTS

| EP | 0632396 A | 1/1995 |
| JP | 2002-091957 | 3/2002 |
| KR | 2001-0093190 A | 10/2001 |
| KR | 2004-0093780 A | 11/2004 |
| WO | 0038170 A | 6/2000 |

* cited by examiner

Primary Examiner—King Y Poon
Assistant Examiner—Lawrence E Wills
(74) Attorney, Agent, or Firm—Cowan, Liebowitz & Latman, P.C.

(57) ABSTRACT

This invention can provide an information processing apparatus and control method thereof, and a program, which can efficiently execute processing associated with font settings. To accomplish this, font information of a first character and font information of a second character, which are located before and after the position of an input character are acquired. When the acquired font information of the first character and the acquired font information of the second character include the same font type, the font type is set as font type information used for the input character. When the acquired font information of the first character and the acquired font information of the second character include different font types, parsing is executed for the character string including the input character, and font type information used for the input character is set based on the parsing result.

12 Claims, 35 Drawing Sheets

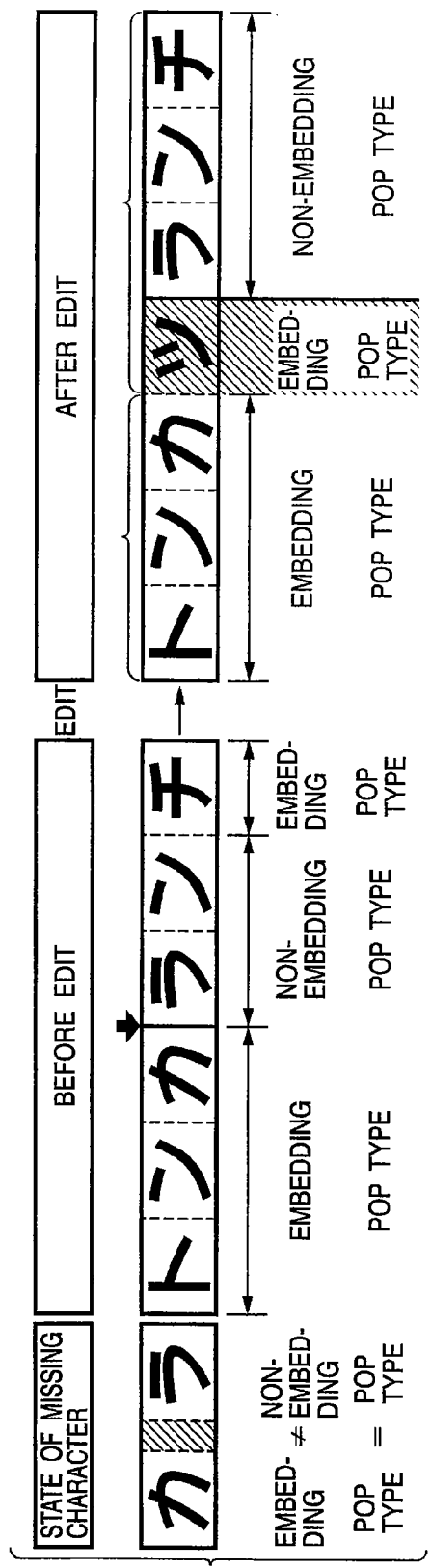
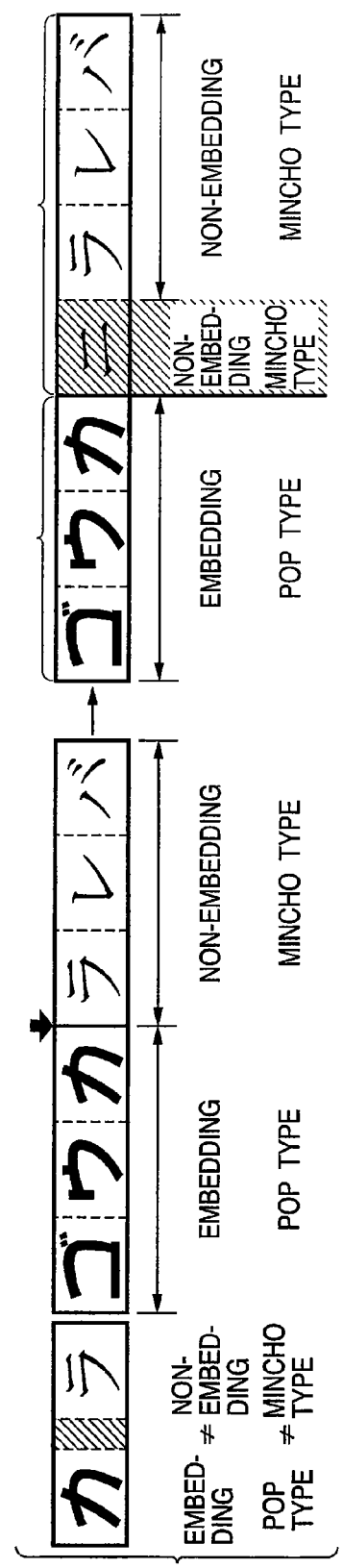
FIG. 6C
FIG. 6D

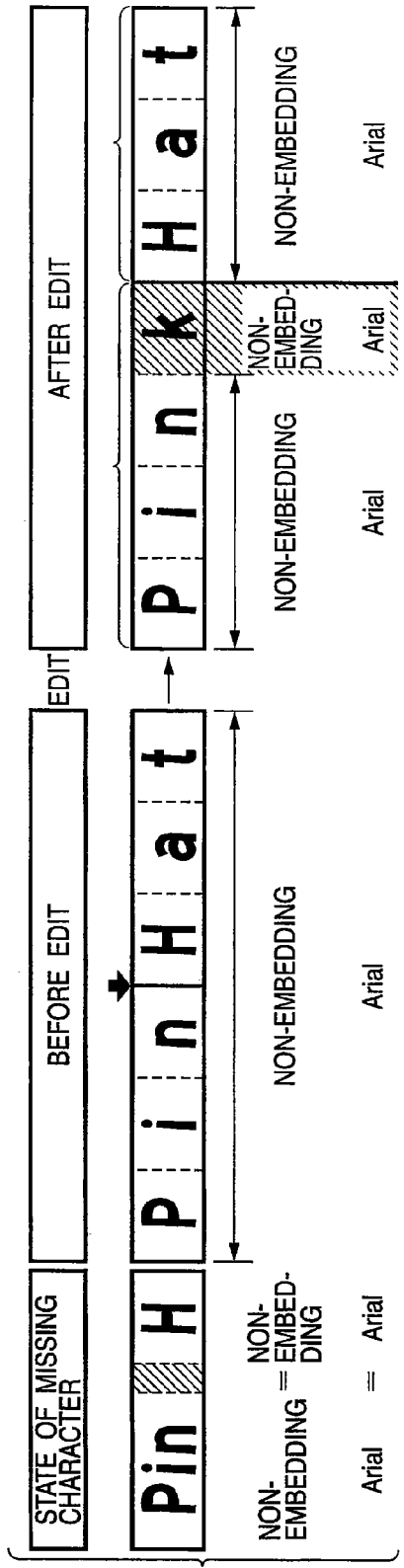
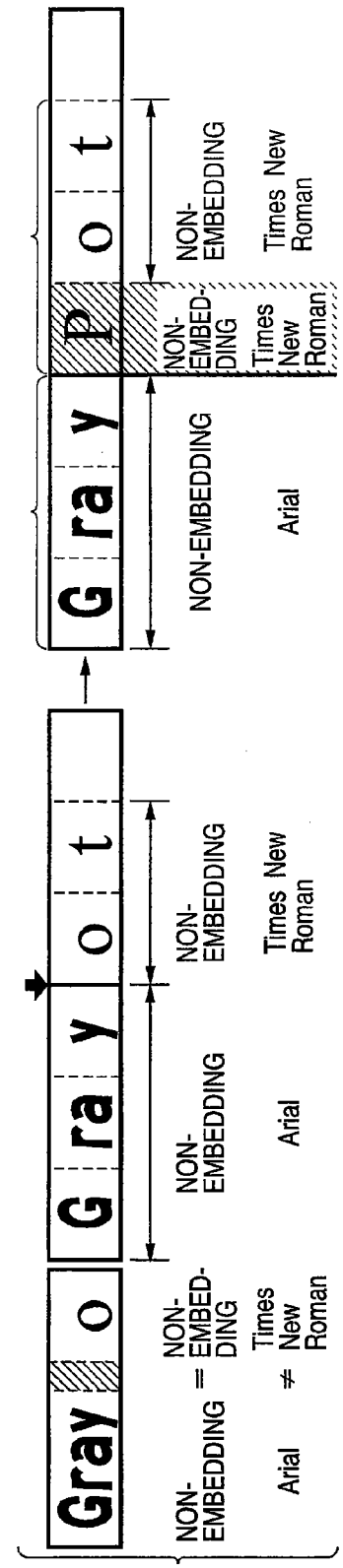
FIG. 6K
FIG. 6L

FIG. 7

| No | INPUT CHARACTER CODE | INPUT CHARACTER POSITION INFORMATION | FONT INFORMATION BEFORE INPUT CHARACTER | FONT INFORMATION AFTER INPUT CHARACTER | FONT EMBED FLAG | INPUT CHARACTER FONT TYPE INFORMATION | ... |
|----|---------------------|--------------------------------------|-----------------------------------------|----------------------------------------|-----------------|---------------------------------------|-----|
| 1 | xxxxx"ナ" | yyyyy | EMBEDDING: ON POP TYPE | EMBEDDING: ON POP TYPE | ON | POP TYPE | ... |
| 2 | xxxxx"ナ" | yyyyy | EMBEDDING: ON MINCHO TYPE | EMBEDDING: ON POP TYPE | ON | MINCHO TYPE | ... |
| 3 | xxxxx"ツ" | yyyyy | EMBEDDING: ON POP TYPE | EMBEDDING: OFF POP TYPE | ON | POP TYPE | ... |
| 4 | xxxxx"ニ" | yyyyy | EMBEDDING: ON POP TYPE | EMBEDDING: OFF MINCHO TYPE | OFF | MINCHO TYPE | ... |
| 5 | xxxxx"ツ" | yyyyy | EMBEDDING: OFF POP TYPE | EMBEDDING: OFF POP TYPE | OFF | POP TYPE | ... |
| 6 | xxxxx"ニ" | yyyyy | EMBEDDING: OFF POP TYPE | EMBEDDING: OFF MINCHO TYPE | OFF | MINCHO TYPE | ... |

| | HIGH-SPEED PRINTER | COLOR PRINTER | MID-SPEED PRINTER 1 | MID-SPEED PRINTER 2 | COLOR PRINTER 2 | MID-SPEED PRINTER 2 | MID-SPEED PRINTER 3 | MID-SPEED PRINTER 4 |
|---|---|---|---|---|---|---|---|---|
| PRINTER NAME | | | | | | | | |
| IP ADDRESS | 200.200.200.001 | 200.200.200.002 | 200.200.200.003 | 200.200.200.004 | 200.200.200.005 | 200.200.200.006 | 200.200.200.007 | |
| COLOR/MONOCHROME | MONOCHROME | COLOR | MONOCHROME | MONOCHROME | COLOR | MONOCHROME | MONOCHROME | |
| PROCESSING CAPABILITY | 200ppm | 80ppm | 100ppm | 100ppm | 80ppm | 100ppm | 80ppm | |
| SUPPORT PAPER SIZE | A2-POSTCARD | A3-POSTCARD | A3-B5 | A3-B5 | A3-POSTCARD | A3-B5 | A3-B5 | |
| DOUBLE-SIDED | ○ | ○ | ○ | ○ | ○ | ○ | ○ | |
| COLLATE | ○ | ○ | ○ | ○ | ○ | ○ | ○ | |
| GROUP | ○ | ○ | ○ | ○ | ○ | ○ | ○ | |
| STABLE | ○ | ○ | ○ | ○ | ○ | ○ | × | |
| SADDLE STITCH | ○ | × | ○ | × | ○ | × | × | |
| PUNCH | ○ | × | × | × | × | × | × | |
| Z-FOLD | ○ | × | ○ | ○ | × | ○ | × | |
| INSERT | ○ | × | ○ | × | × | × | × | |
| TAB SHEET | ○ | × | × | × | × | × | × | |
| CUT | ○ | × | × | × | × | × | × | |
| MAXIMUM CAPACITY | 4000 SHEETS | 3000 SHEETS | 1000 SHEETS | 1000 SHEETS | 3000 SHEETS | 1000 SHEETS | 1000 SHEETS | |
| PAPER FEED PORT 1 | A4/PLAIN PAPER | A4/PLAIN PAPER | A4/PLAIN PAPER | A4/PLAIN PAPER | A4/PLAIN PAPER | A4/PLAIN PAPER | A4/PLAIN PAPER | |
| PAPER FEED PORT 2 | B4/PLAIN PAPER | A3/PLAIN PAPER | A3/PLAIN PAPER | A4/COLOR PAPER | A4/PLAIN PAPER | A4/PLAIN PAPER | A4/PLAIN PAPER | |
| PAPER FEED PORT 3 | A3/PLAIN PAPER | A4/GLOSSY PAPER | A3/PLAIN PAPER | A3/PLAIN PAPER | A4/PLAIN PAPER | A3/PLAIN PAPER | A4/PLAIN PAPER | |
| PAPER FEED PORT 4 | A4/PLAIN PAPER | A4/HEAVY PAPER | A4/PLAIN PAPER | | A4/PLAIN PAPER | | | |
| PAPER FEED PORT 5 | B5/PLAIN PAPER | | | | | | | |
| MINCHO TYPE | ○ | ○ | ○ | ○ | ○ | ○ | ○ | |
| KAKU GOTHIC TYPE | ○ | ○ | × | ○ | ○ | ○ | ○ | |
| POP TYPE | ○ | ○ | × | × | × | ○ | × | |
| GYOSHO TYPE | ○ | × | … | … | … | … | … | |
| … | … | | | | | | | |

| TARGET FONT | SIMILAR FONT | EMBED |
|---|---|---|
| MS MINCHO TYPE | MINCHO TYPE | ON |
| MS GOTHIC TYPE | GOTHIC TYPE | ON |
| POP TYPE | ABC POP TYPE | ON |
| KAISHO TYPE | ABC KAISHO TYPE | OFF |
| ⋮ | ⋮ | ⋮ |

FIG. 16

| ATTRIBUTE | VALUE | ⋮ |
|---|---|---|
| FONT TYPE | ABC POP TYPE | ⋮ |
| TARGET CHARACTER | "タカナ" | ⋮ |
| TARGET CHARACTER INFORMATION | C | SUBSTITUTE ALL SAME CHARACTER STRINGS AS WORD INCLUDING ADDED CHARACTER IN TARGET PAGE |
| ⋮ | ⋮ | ⋮ |

1600

SUBSTITUTE ALL SAME CHARACTER STRINGS AS WORD INCLUDING ADDED CHARACTER IN TARGET PAGE

SUBSTITUTE ALL SAME CHARACTER STRINGS AS WORD INCLUDING ADDED CHARACTER IN ALL PAGES (FILE)

SUBSTITUTE ALL CHARACTER STRINGS OF TEXT OBJECT OF WORD INCLUDING ADDED CHARACTER

SELECT AND SUBSTITUTE TARGET CHARACTER STRING

FIG. 23A

STATE OF MISSING CHARACTER — EDIT (ADD 'メ') — AFTER EDIT (ALL SAME FONTS AFTER EMBEDDING OF 'メ')

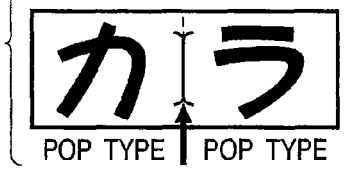
POP TYPE | POP TYPE

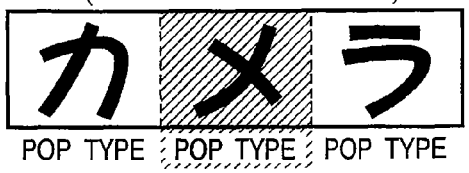
POP TYPE | POP TYPE | POP TYPE

FIG. 23B

MARU GOTHIC | MARU GOTHIC

MARU GOTHIC | MARU GOTHIC | MARU GOTHIC

FIG. 23C

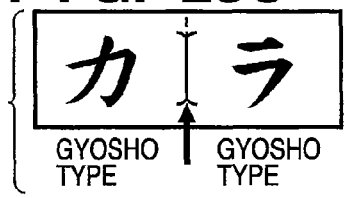
GYOSHO TYPE | GYOSHO TYPE

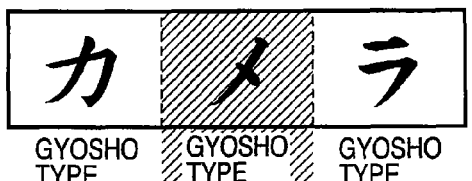
GYOSHO TYPE | GYOSHO TYPE | GYOSHO TYPE

FIG. 23D

STATE OF MISSING CHARACTER — EDIT (ADD 'e') — AFTER EDIT (ALL SAME FONTS AFTER EMBEDDING OF 'e')

Arial | Arial

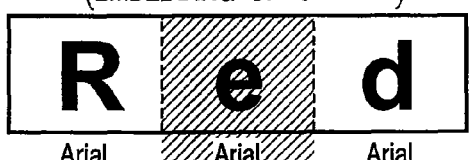
Arial | Arial | Arial

FIG. 23E

Times New Roman | Times New Roman

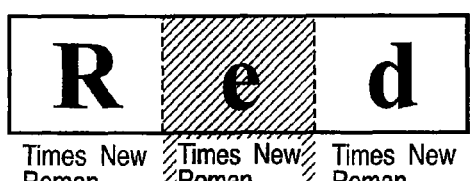
Times New Roman | Times New Roman | Times New Roman

FIG. 23F

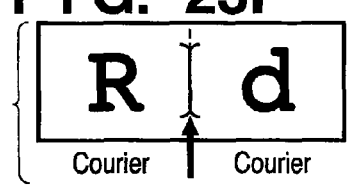
Courier | Courier

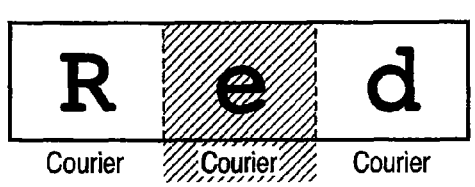
Courier | Courier | Courier

INFORMATION PROCESSING APPARATUS AND CONTROL METHOD THEREOF, AND PROGRAM

BACKGROUND OF THE INVENTION

1. Field of the Invention

The present invention relates to an information processing apparatus and control method thereof, and a program, which set a font used for a new input character when the character is input into a character string in which font information is set for each character.

2. Description of the Related Art

Conventionally, print service providers who generate printed materials according to requests from customers such as personal users, enterprises, and the like exist. Such print service provider provides services for creating printed materials by receiving print data (master copy) and instructions of a print style, the number of copies, due date, and the like from a customer, and delivering the printed materials. Such print service providers provide services using large-scale printers such as conventionally known offset reproduction printing presses and the like.

On the other hand, recently, electrophotographic printers and ink-jet printers have been speeded up and have gained high image quality. Along with such trend, a business category of commercial printing (print service) called "copy service", "printing service", "Print On Demand (POD) center", and the like, which allow quick output and delivery, exist.

A print request to such printing business is made from the user to a print service provider who provides the aforementioned print services. More specifically, the user sends by mail or directly brings, to a printing company, documents recorded on paper sheets or a digital medium (FD, MO, CD-ROM, or the like) and a print instruction (order instruction) that describes the number of copies to be printed, bookbinding method, due date, and the like of the documents (document reception).

Also, a printing system which can place or receive a print order and receive documents online via the Internet or intranet has come into practical use. The print service provider side prepares a print instruction upon reception of a request from the user. The print service provider prints and binds works using a printer connected to a work computer in accordance with the print instruction, and delivers created printed materials to a customer, thus completing the service.

The print service provider who executes print processing commissioned from the user must safely complete printing with stable quality until the designated due date. For this purpose, the print service provider makes a plurality of operators serially process a large number of print requests (orders) using a wide variety of printers and hosts in parallel.

It is demanded to smoothly and surely process respective work processes, and to use human (operators who are assigned works) and hardware resources as efficiently as possible. As a result, making and managing a plan (schedule) with high work efficiency in consideration of the due dates and cost is important.

In the prior art, there exists a workflow, based on the divisions of labor, which designates only the font type without executing font embedding processing in a pre-process such as a document layout, print settings, and the like, and executes embedding of font and creation of print data in a post-process such as print execution, and the like.

In this case, a work PC for the pre-process (e.g., a PC of an operator in charge of the pre-process) is different from that for the post-process (e.g., a PC of an operator in charge of the post-process), and these two work PCs may be installed with different types of fonts. For example, when the operator makes font settings and print settings for characters at the work PC for the pre-process with no regard to fonts installed in the work PC for the post-process, the work PC for the post-process does not have the corresponding fonts. For this reason, upon embedding fonts and creating print data in the post-process, the operator cannot proceed with the processing, thus causing an error. If an error has occurred, the workflow must return to the pre-process, and the operator must redo works such as font setting change, and the like, resulting in poor efficiency.

Recently, in order to solve this problem, the following system has been proposed (see Japanese Patent Laid-Open No. 2002-91957). That is, the system has an arrangement which allows a system of the work PC for the pre-process to acquire embeddable font information installed in the work PC for the post-process upon making the print settings (font settings and the like) in the pre-process. Then, the work PC for the pre-process displays information of only embeddable fonts installed in the work PC for the post-process, and prompts the operator to select fonts so as to complete the embedding processing, thereby preventing the post-process from causing any errors.

In the conventional system and workflow, if the print service provider finds wrong or missing characters in a document, and if the system is installed with a font used for a character and character string to be edited (added), the print service provider can take a measure (editing and font embedding).

Note that the character and character string to be edited (added) will be simply referred to as a character hereinafter in some cases.

An operation example upon adding the character will be described below using FIGS. 23A to 23F.

FIGS. 23A to 23C show an example in which "メ" is missing, resulting in "カラ".When the system is installed with the corresponding font, "メ" is inserted (added) to correct "カラ". to an original character string "カメラ". Then, a font common to the character string (the same font as "カラ". (POP type)) is appropriately embedded to execute print processing.

FIGS. 23D to 23F show an example in which a letter "e" is missing, resulting in "Rd". If the system is installed with the corresponding font, "e" is inserted (added) to correct "Rd" to an original character string "Red", and a font common to the character string (the same font as "Rd" (Arial)) is appropriately embedded to execute print processing.

However, in case of a font which is not installed in the system, it is impossible for the print service provider to apply correction (font embedding) in a form that keeps high print quality. FIGS. 24A to 24C show an example in which "メ" is missing, resulting in "カラ". as in FIGS. 23A to 23C. In this example, however, the system is not installed with the corresponding font. It is possible to insert (add) "メ" to correct "カラ". to an original character string "カメラ". However, an appropriate font (the same font as "カ" and "ラ" (POP type)) corresponding to that character string cannot be embedded. FIGS. 24D to 24F show an example in which alphabet "e" is missing, resulting in "Rd", as in FIGS. 23D to 23F. similar to the previous example, these figures show a case in which the system is not installed with the corresponding font. It is possible to insert (add) "e" to correct "Rd" to an original character string "Red". However, an appropriate font (the same font as "Rd" (Arial)) corresponding to that character string cannot be embedded.

Hence, FIGS. 24A to 24F adopt processing for embedding a font similar to that of characters before and after the character to be inserted (added). In this case, print processing is done using inconsistent fonts. For example, in case of the example of FIG. 24A, the font of "カ" and "ラ" is "POP type", but "メ" to be inserted adopts "Kaku Gothic" as a font similar to "POP type".

In such a case, the print service provider requests the request source to correct and re-send the document to maintain print quality. As a result, the print service provider spends unscheduled time until re-reception of the document, and need to change and adjust plans (schedules) including other related jobs. Also, the work of the operator is interrupted.

In this way, the overall work efficiency drops considerably, and the due date cannot be met in the worst case.

In order to solve inconsistency of the fonts, the fonts of characters within an arbitrary range are re-set to a substitute font. More specifically, when only "メ" of the character string "カメラ". in FIGS. 24A to 24C has a different font, the operator manually selects the character string "カメラ". re-sets the entire character string "カメラ". to an identical font using a dialog shown in FIG. 25, and embeds that font. Likewise, when only "e" of the character string "Red" in FIG. 24D has a different font, the operator manually selects the character string "Red", re-sets the entire character string "Red" to an identical font using the dialog shown in FIG. 25, and embeds that font.

In this manner, as shown in FIGS. 26A to 26C, the character string "カメラ". is set to have a common font. Also, as shown in FIGS. 26D to 26F, the character string "Red" is set to have a common font. However, in this case, since the operator must manually designate the character range to be changed, and designate a font to be changed, he or she must do an extra work. If there is a plurality of character strings to be changed, the work efficiency further drops.

Since the operator makes decisions about designation of the character range to be changed (whether or not characters are appropriate) and designation of a font to be changed (similarity of fonts) with given knowledge, it is difficult to maintain consistency about designation of substitute fonts among a plurality of operators.

As described above, the work efficiency of each operator drops, and each operator is required to have knowledge and skill.

SUMMARY OF THE INVENTION

The present invention has been made to solve the aforementioned problem, and has as its object to provide an information processing apparatus and control method thereof, and a program, which allow the operator to efficiently execute processing associated with font settings.

According to the present invention, the foregoing object is attained by providing an information processing apparatus which sets font information used for an input character when the character is newly input in a character string in which font information is set for each character, comprising:

acquisition means for acquiring font information of a first character and font information of a second character, which are located before and after a position of the input character;

first setting means for, when the font information of the first character and the font information of the second character acquired by the acquisition means include the same font type, setting the font type as font type information used for the input character; and second setting means for, when the font information of the first character and the font information of the second character acquired by the acquisition means include different font types, executing parsing for the character string including the input character, and setting font type information used for the input character based on the parsing result.

In a preferred embodiment, the apparatus further comprises:

determination means for determining a status of a flag indicating the presence/absence of embedded font settings, which is included in each of the font information of the first character and the font information of the second character acquired by the acquisition means; and execution means for setting the flag for the input character to be ON or OFF based on the determination result of the determination means, and executing one of the first setting means and the second setting means.

In a preferred embodiment, when the state of the flag included in at least one of the font information of the first character and the font information of the second character acquired by the acquisition means is ON based on the determination result of the determination means, the execution means sets the flag for the input character to ON.

In a preferred embodiment, the apparatus further comprises:

processing setting means for setting processing contents of font setting processing executed when the flag for the input character is set to ON; and storage means for storing processing setting information set by the processing setting means in a storage medium, and in that the processing setting means has, as setting items:

a first setting item used to search for font information including font type information set for the input character;

a second setting item used to search for a printing device which is pre-installed with font information including font type information set for the input character;

a third setting item used to search for substitute font information having substitute font type information to the font type information; and a fourth setting item used to execute one of the first to third setting items or a setting item as an arbitrary combination of the first to third setting items.

In a preferred embodiment, the apparatus further comprises:

font setting processing means for, when the flag for the input character is set to ON, executing the font setting processing based on the processing setting information stored in the storage means.

In a preferred embodiment, when the first setting item is set in the processing setting information, the font setting processing means executes, based on the setting contents, at least one of:

first search processing for searching for font information including font type information set in the input character from identical page data including the character string;

second search processing for searching for font information including font type information set in the input character from identical file data including the character string; and third search processing for searching for font information including font type information set in the input character from file data having the same attribute as that of file data including the character string, and the font setting processing means sets the font information acquired by the executed search processing as font information for the input character.

In a preferred embodiment, when the second setting item is set in the processing setting information, the font setting processing means executes, based on the setting contents:

printing device acquisition processing for acquiring printing device information of a printing device which is usable by the information processing apparatus;

determination processing for determining whether or not the printing device information acquired by the printing device acquisition processing has printing device information having font information including font type information set for the input character; and printing device setting processing for setting a printing device used to print the input character based on the determination result of the determination processing.

In a preferred embodiment, when the third setting item is set in the processing setting information, the font setting processing means executes, based on the setting contents:

reference processing for referring to a font table, which manages substitute font information including a font type and a substitute font type as a substitute for the font type, based on the font information of the first character and the font information of the second character, which are located before and after the position of the input character;

selection processing for selecting the substitute font information from the substitute font information referred to by the reference processing; and specifying processing for specifying a character that uses the substitute font information selected by the selection processing, and the font setting processing means settles the substitute font information selected by the selection processing as font information of the character specified by the specifying processing.

In a preferred embodiment, the apparatus further comprises:

substitute setting means for, when the font setting processing means searches for the substitute font information, setting a character that uses the retrieved substitute font information.

According to the present invention, the foregoing object is attained by providing a method of controlling an information processing apparatus, which sets font information used for an input character when the character is newly input in a character string in which font information is set for each character, comprising:

an acquisition step of acquiring font information of a first character and font information of a second character, which are located before and after a position of the input character;

a first setting step of setting, when the font information of the first character and the font information of the second character acquired in the acquisition step include the same font type, the font type as font type information used for the input character; and a second setting step of executing, when the font information of the first character and the font information of the second character acquired in the acquisition step include different font types, parsing the character string including the input character, and setting font type information used for the input character based on the parsing result.

According to the present invention, the foregoing object is attained by providing a computer program which is stored in a computer-readable medium and makes a computer control an information processing apparatus, which sets font information used for an input character when the character is newly input in a character string in which font information is set for each character, the program characterized by making the computer execute:

an acquisition step of acquiring font information of a first character and font information of a second character, which are located before and after a position of the input character;

a first setting step of setting, when the font information of the first character and the font information of the second character acquired in the acquisition step include the same font type, the font type as font type information used for the input character; and a second setting step of executing, when the font information of the first character and the font information of the second character acquired in the acquisition step include different font types, parsing the character string including the input character, and setting font type information used for the input character based on the parsing result.

According to the present invention, the foregoing object is attained by providing a character processing apparatus comprising:

selection means for, when a character is to be inserted into a character string and a font of a character which neighbors the character to be inserted is not available, selecting a font similar to the font of the neighboring character; and setting means for setting the font of the character to be inserted and the font of the neighboring character to the font selected by the selection means.

In a preferred embodiment, when a character is to be inserted into a character string and a font of a character which neighbors the character to be inserted is available, the setting means sets the font of the neighboring character to the font of the character to be inserted.

According to the present invention, the foregoing object is attained by providing a character processing method comprising:

a selection step of selecting, when a character is to be inserted into a character string and a font of a character which neighbors the character to be inserted is not available, a font similar to the font of the neighboring character; and a setting step of setting the font of the character to be inserted and the font of the neighboring character to the font selected in the selection step.

In a preferred embodiment, the setting step includes a step of setting, when a character is to be inserted into a character string and a font of a character which neighbors the character to be inserted is available, the font of the neighboring character to the font of the character to be inserted.

According to the present invention, the foregoing object is attained by providing a computer program, which is stored in a computer-readable medium and makes a computer execute character processing, the program characterized by making the computer execute:

a selection step of selecting, when a character is to be inserted into a character string and a font of a character which neighbors the character to be inserted is not available, a font similar to the font of the neighboring character; and a setting step of setting the font of the character to be inserted and the font of the neighboring character to the font selected in the selection step.

In a preferred embodiment, the setting step includes a step of setting, when a character is to be inserted into a character string and a font of a character which neighbors the character to be inserted is available, the font of the neighboring character to the font of the character to be inserted.

Further features of the present invention will become apparent from the following description of exemplary embodiments with reference to the attached drawings.

BRIEF DESCRIPTION OF THE DRAWINGS

FIGS. 6A to 6L are views for explaining character edit examples according to the embodiment of the present invention;

FIG. 7 shows an example of an input character information table according to the embodiment of the present invention;

FIG. 12 shows an example of a printing device information table according to the embodiment of the present invention;

FIG. 15 shows an example of a similar font table according to the embodiment of the present invention;

FIG. 16 shows an example of an input character substitute font table according to the embodiment of the present invention;

FIGS. 23A to 23F are views for explaining character edit examples;

DESCRIPTION OF THE EMBODIMENTS

Preferred embodiments of the present invention will now be described in detail with reference to the drawings. It should be noted that the relative arrangement of the components, the numerical expressions and numeric values set forth in these embodiments do not limit the scope of the present invention unless it is specifically stated otherwise.

Figure 1:
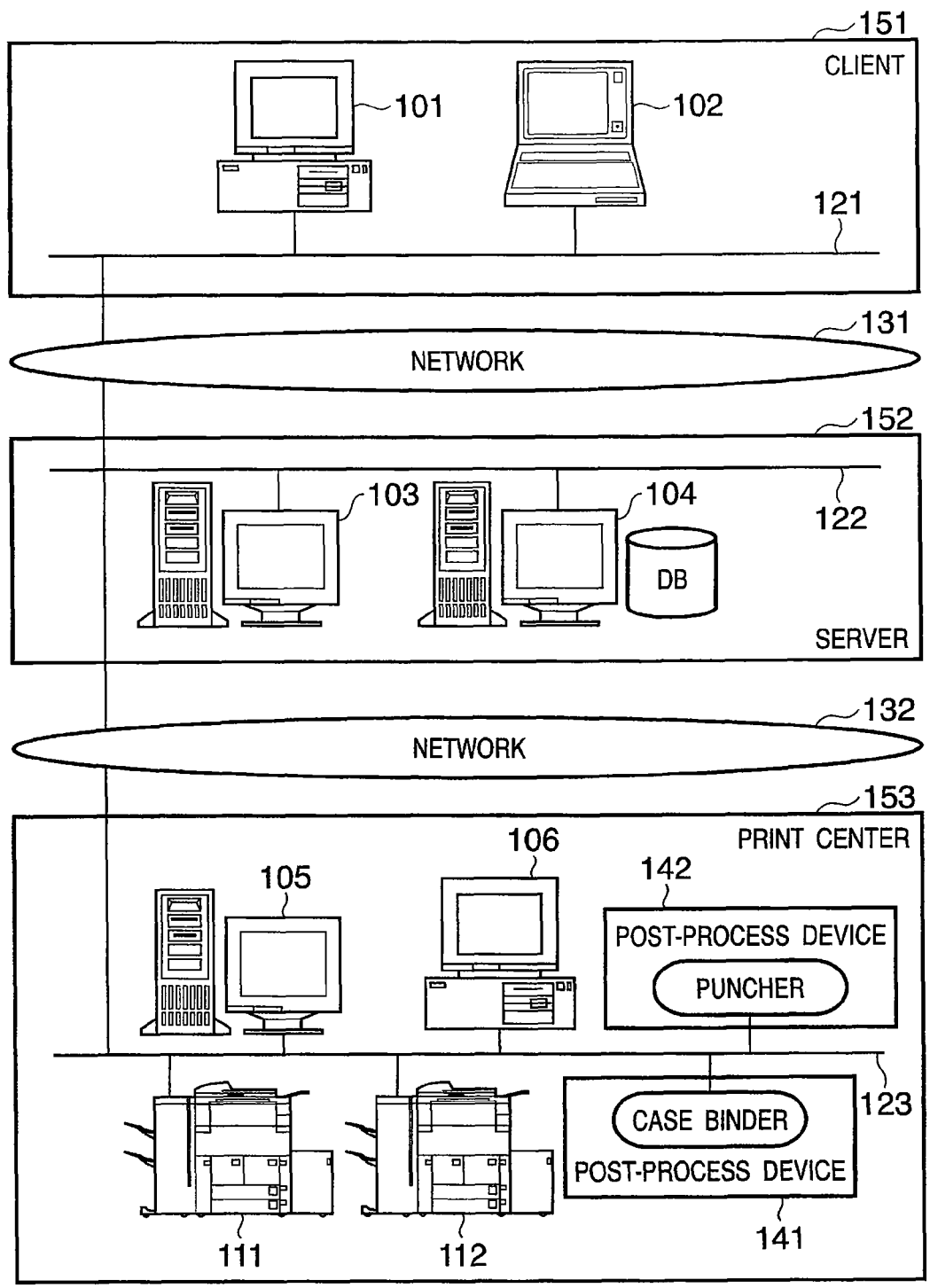
FIG. 1 is a diagram showing the overall arrangement of a printing system according to one embodiment of the present invention.

FIG. 1 is a diagram showing an example of the overall arrangement of a printing system according to one embodiment of the present invention.

Note that the environments of the entire printing system in the following description are adopted to allow easy understanding of the description of the present invention, and the present invention is not limited to these environments.

In FIG. 1, a client 151 includes a notebook type PC (personal computer) 102 which is connected to a network at home, and a business PC 101 connected to an office intranet. The business PC 101 and notebook type PC 102 included in the client 151 are connected to a network 131 via a LAN 121.

A server 152 includes an information processing apparatus which receives print request data from the client 151. The server 152 includes a WEB server 103 which receives document data, and provides document reception contents, and a DB server 104 which stores received print request data as order form data (order note), and stores digitally received document data.

Note that the WEB server 103 and DB server 104 may exist in a single housing together. However, the present invention will separately explain these servers in two housings for the sake of simplicity. The WEB server 103 and DB server 104 in the server 152 are connected to the network 131 via a LAN 122.

A plurality of print centers 153 can exist with respect to the server 152. Note that the information processing apparatuses of the server 152 distribute and manage device information of various printers equipped in the print centers 153. Each print center 153 periodically corrects the order form data and document data stored in the server 152 from the DB server 104.

In addition, each print center 153 comprises a server 105 on which the printing system itself of the present invention runs, and a work PC 106 which is used to manipulate various services provided by the server 105 using GUIs. Furthermore, each print center 153 comprises a monochrome printer 111 and color printer 112 which serve as actual output destinations, and post-process devices (case-binding function) 141 and 142 (puncher function), which are used after printing. The respective devices equipped in each print center 153 are connected to each other via a LAN 123, and are connected to a network 132 via this LAN 123.

Note that the arrangement and environment of each print center 153 are merely examples, and are not limited to the arrangement shown in FIG. 1.

In this embodiment, the client 151 and server 152, or the server 152 and print center 153 are connected via the network (e.g., the Internet/Intranet) 131. The client 151 and server 152 are normally connected via the Internet, and the server 152 and print center 153 are normally connected via the Intranet using a dedicated line. However, the present invention is not limited to this arrangement, and can be applied to an arrangement in which the print center 153 includes the server 152.

The notebook type PC 102 and business PC 101 included in the client 151 comprise browsers used to access the document reception contents provided by the WEB server 103. As this browser, Internet Explorer available from Microsoft Corporation is popularly used, but Netscape Navigator available from Netscape and the like may be used. Also, the user can upload document data using the document reception contents.

The WEB server 103 provides the document reception contents. To the document reception contents, the user can append information such as a print style such as bookbinding and the like, print settings such as the number of copies, paper sizes, and the like, a due state, client information, address for delivery, and the like. The WEB server 103 equips various controls required to issue a print request such as an edit control required to append these pieces of information, a file designation control required to upload document data, and the like.

A service module which runs on the WEB server 103 implements processing such as charge calculations (when a print charge is calculated (upon accepting a print charge online)), input item settlement processing, and the like. However, since these kinds of processing are general logics, and do not directly relate to the present invention, a description thereof will be omitted. Furthermore, the WEB server 103 stores the order form data (which describes the print request contents and the file name of document data) and document data corresponding to the settled print request in the DB server 104.

The DB server 104 is installed with, e.g., a general database such as Oracle Database available from Oracle. The DB server 104 can transmit desired order form data and document data in response to a data acquisition request from the server 105 (to be described later).

A DB schema (not shown) mainly includes a print center master table, device master table, and bookbinder master table.

The print center master has, e.g., information including locations, contact addresses, and the like, the device master, and bookbinder master as members. The device master includes, e.g., device configuration information such as color/monochrome, the number of printable sheets, options, and the like. The bookbinder master includes, e.g., information of a ring binder, case binder, and the like.

With reference to these master tables, the server 105 in the print center 153 can receive the order form data assigned to the self center.

Upon reception of an order settlement message from the WEB server 103, the server 105 collects order form data and document data from the DB server 104. In addition, the server 105 operates a printing system which comprises an order manager, workflow manager, job manager, device manager, and device scheduler.

The work PC 106 implements a console which controls various services provided by the server 105 via operation windows (GUIs). The work PC 106 can extract document data stored in the server 105 via this console. Furthermore, the work PC 106 is a work information processing apparatus (computer), which launches a predetermined application to format the print style of the acquired document data, and inputs a print instruction based on the designated print settings.

The monochrome printer 111 and color printer 112 generally include a combination of a high-speed monochrome printer and high-quality color printer, although the equipped arrangements are different depending on the print centers 153. The device scheduler of the server 105 schedules these printers in association with print processing.

The post-process devices 141 and 142 execute post-processing of printed paper sheets output from the monochrome printer 111 and color printer 112. These devices include, e.g., a stapler, puncher, case binder, and ring binder. The server 105 can collect status information of these devices when the devices are connected to the network. The equipped arrangements of these devices are different depending on the print centers 153 like in the printers. Of course, the present invention can be applied to even an environment in which these devices are not connected to the network, and is not limited to such specific environment.

The basic hardware arrangement of various terminals such as the business PC 101, notebook type PC 102, WEB server 103, DB server 104, server 105, and work PC 106 will be described below using FIG. 2.

Figure 2:
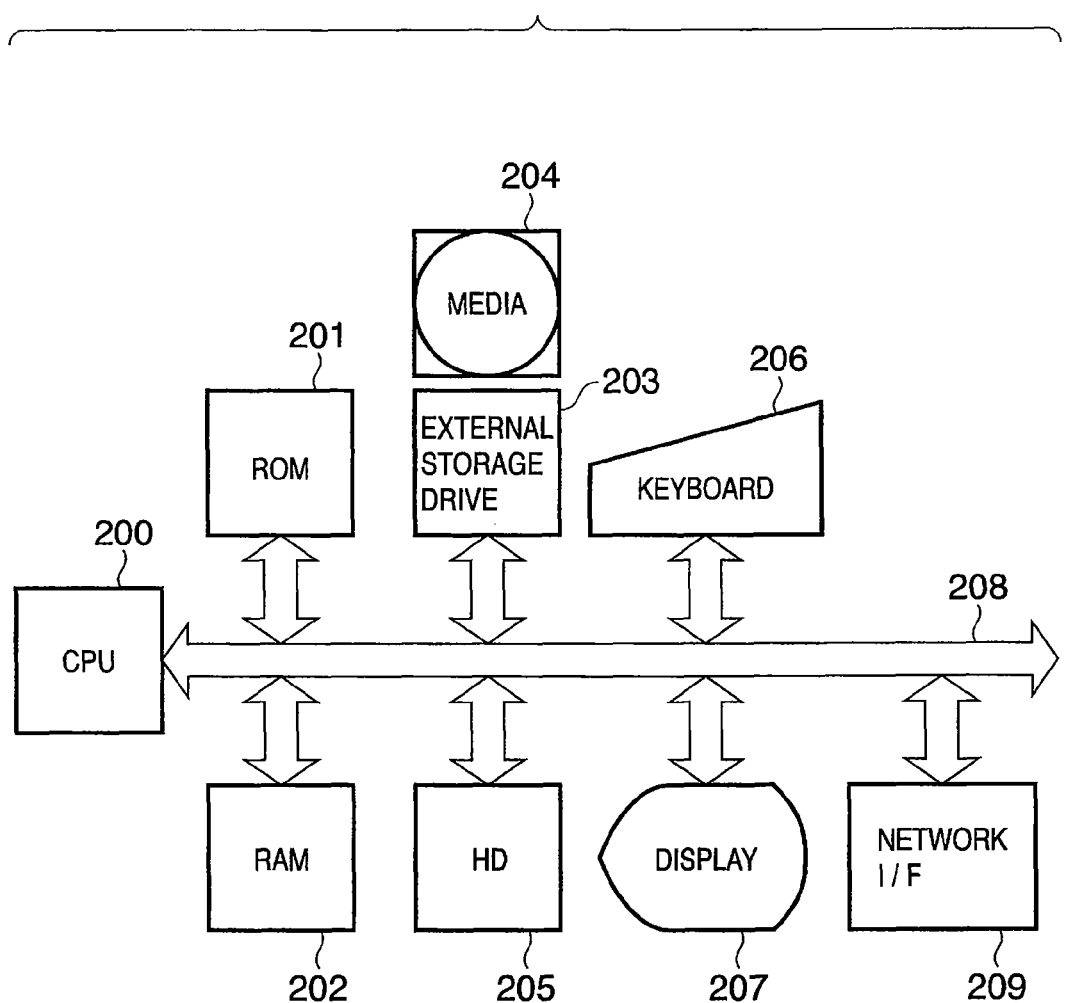
FIG. 2 is a block diagram showing the basic hardware arrangement of a terminal according to the embodiment of the present invention.

FIG. 2 is a block diagram showing the basic hardware arrangement of the terminal according to the embodiment of the present invention.

A CPU 200 executes various programs including application programs, printer driver programs, an OS, network printer control programs, and the like stored in an HD (hard disk) 205. The CPU 200 makes control to temporarily store, in a RAM 202, data such as information, files, and the like required to execute the programs.

A ROM 201 stores programs such as a basic I/O program and the like, and various data such as font data, template data, and the like used in document processing. The RAM 202 serves as a main memory, work area, and the like of the CPU 200. An external storage drive 203 can load data such as programs and the like stored in a storage medium 204 to the computer system of this embodiment.

The storage medium 204 stores programs and related data described in this embodiment, and the stored contents will be explained later using FIG. 4. As the storage medium 204, for example, various storage media such as a CD-ROM, DVD-ROM/RAM/R/RW, IC memory card, and the like can be used.

The HD 205 stores various programs such as application programs, printer driver programs, an OS, control programs, related programs, and the like. The user inputs commands such as device control commands and the like using a keyboard 206. In addition, a pointing device such as a mouse or the like may be equipped.

A display 207 comprises a CRT, liquid crystal display, or the like, and displays various kinds of information such as commands input from the keyboard 206 or pointing device (not shown), printer status, and the like. Reference numeral 208 denotes a system bus which interconnects various building components in the terminal and serves as a communication path of data. A network interface (I/F) 209 is a communication interface used to connect a local area network (LAN) or the Internet.

The memory map on which programs that implement the present invention are loaded onto the RAM 202 and are ready to run will be described below using FIG. 3.

Figure 3:
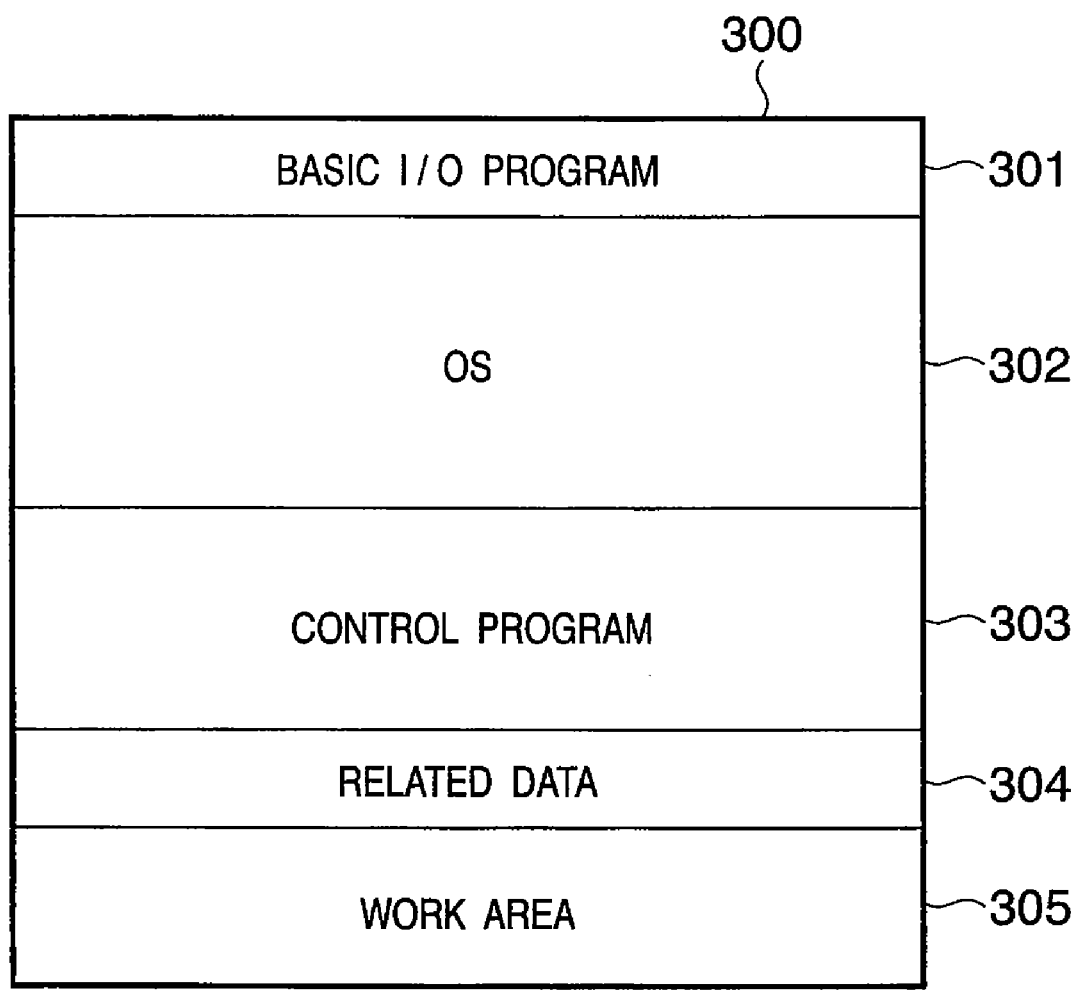
FIG. 3 shows an example of the memory map of a RAM according to the embodiment of the present invention.

FIG. 3 shows an example of the memory map of the RAM according to the embodiment of the present invention.

This embodiment will exemplify a case wherein the CPU 200 directly loads programs and related data from the storage medium 204 onto the RAM 202 and executes them. However, in addition, every time the programs of the present invention are launched from the storage medium 204 or HD 205, they may be loaded from the storage medium 204 or HD 205 onto the RAM 202. The ROM 201 may record the programs of the present invention to form a part of its memory map, and the CPU 200 may directly execute them.

Referring to FIG. 3, reference numeral 301 denotes an area that stores a basic I/O program. This basic I/O program has an IPL (initial program loading) function and the like, which loads the OS from the HD 205 onto the RAM 202 and starts the operation of the OS upon power ON of the terminal. Reference numeral 302 denotes an area that stores the OS; 303, an area that stores control programs, and 304, an area that stores related data (parameters, fixed data, and the like) related to various programs such as control programs and the like. Reference numeral 305 denotes an area which forms a work area on which the CPU 200 executes the programs of this embodiment.

The memory map of the storage medium 204 will be described below using FIG. 4.

Figure 4:
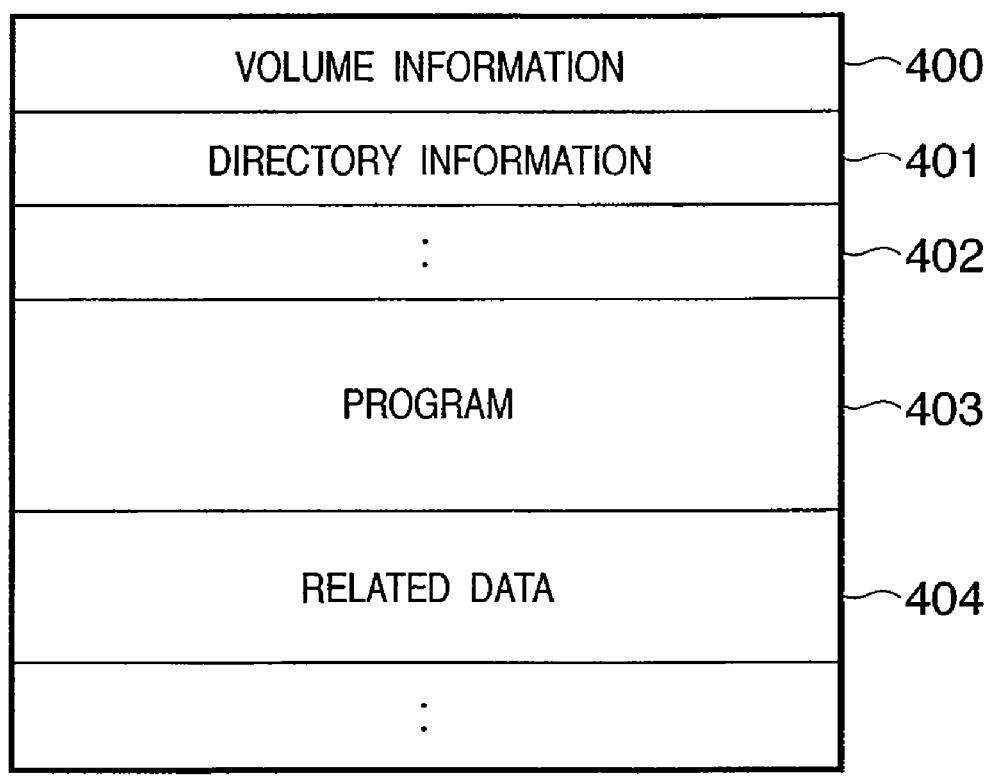
FIG. 4 an example of the memory map of a storage medium according to the embodiment of the present invention.

FIG. 4 shows an example of the memory map of the storage medium according to the embodiment of the present invention.

Referring to FIG. 4, reference numeral 400 denotes data contents of the storage medium 204; 401, volume information indicating information of data; 402, directory information; 403, a program required to implement this embodiment; and 404, its related data. Note that the program 403 is required to implement the flowcharts shown in FIGS. 5A to 5E.

The character edit processing in the printing system according to this embodiment and its processing examples will be described below.

FIGS. 5A to 5E are flowcharts showing the character edit processing in the printing system according to the embodiment of the present invention.

This processing will be explained below in accordance with examples of characters or character edit work states and font information shown in FIGS. 6A to 6F. Note that FIGS. 6A to 6F will explain edit examples of katakana character strings. FIGS. 6G to 6L show edit examples for alphabet character strings, and correspond to those in FIGS. 6A to 6F.

This processing is premised on the situation that the host computer does not store font information to be embedded for code information to be processed. Even when a character edit work is done in such situation, the embedding processing of the font of interest, use settings of the font of interest, and selection and embedding processing of an optimal substitute font are automatically executed. In this way, the edit work of the document, and the print work of characters after the edit work can be efficiently executed.

Furthermore, a plurality of operators can maintain consistency associated with designation of substitute fonts. In this manner, since each operator is not required to have special knowledge and skill about the edit work, the degree of freedom in role assignment can be improved.

Note that font embedding means that font information (font type (type face), size, font image) is embedded (assigned (set)) in an input character (code information). Fonts generated by font embedding will be referred to as embedded fonts. A file or data made up of the embedded fonts can reproduce characters with type faces and sizes that the file creator intended based on the font information included in that file independently of a font environment of the system of the user.

Practical examples to be described below will explain a case wherein, for example, the operator executes a character edit work at the work PC 106 (FIG. 1). The operator executes this character edit work for characters to be edited which are displayed on the display 207 of the work PC 106 using peripheral devices such as the keyboard 206, pointing device, and the like. An application program for the character edit work is installed in the work PC 106. The operator can execute various character edit works via graphical user interfaces (e.g., dialogs) displayed upon launching this application program.

Determination of the work contents in the character edit work and determination of character addition position information will be described first using an example of FIG. 6A.

Figure 6A:
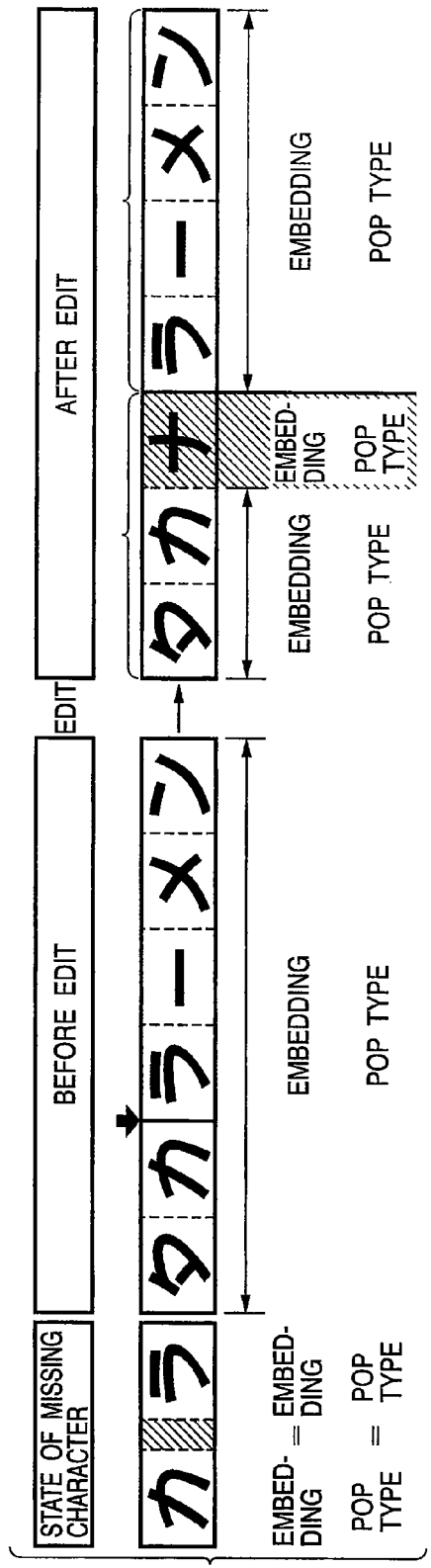

FIG. 6A shows an example in which "ナ" is missing from the position between "カ" and "ラ" in "タカラーメン" as a character string to be edited. In this example, all characters have embedding settings, and "POP type" is set for all the characters as identical font type information.

The work PC 106 (FIG. 1) loads various kinds of document information of an edit file including the character string to be edited onto the RAM and displays the character string to be edited on the display 207 in accordance with the loaded information prior to execution of the processing. The operator executes the edit work of the character string to be edited. Edit information generated upon execution of the edit work is stored in the RAM 202 as needed.

The CPU 200 determines based on edit information acquired from the RAM 202 if a character is edited (step S2701). If it is determined that a character is not edited (NO in step S2701), the CPU 200 ends the processing. On the other hand, if it is determined that a character is edited (YES in step S2701), the CPU 200 determines based on the edit information acquired from the RAM 202 if a character is deleted (step S2702). If it is determined that a character is deleted (YES in step S2702), the CPU 200 ends the processing.

On the other hand, if it is determined that a character is not deleted (NO in step S2702), the CPU 200 determines that the operator added a character by the edit work. The CPU 200 acquires code information of the input character from the RAM 202 and stores it in an input character information table 700 (FIG. 7) (step S2703). The CPU 200 then acquires the position information of the input character from the RAM 202, and stores it in the input character information table 700 (step S2704).

The input character information table 700 will be described below using FIG. 7.

FIG. 7 shows an example of the input character information table according to the embodiment of the present invention.

The input character information table 700 is used to manage information associated with input characters, and is stored on, e.g., the HD 205. In this embodiment, as shown in FIG. 7, the table 700 manages an input character code, input character position information, font information of characters present before and after the input character, status of a font embed flag, and font type information of the input character.

Note that the input character position information indicates the position coordinates of a character displayed on a character edit region in a character edit dialog on the work PC 106. The font information includes the status of a font embed flag, font type, code information, size, font image, which are set for that character.

The font embed flag (ON/OFF) indicates the presence/absence of an embedded font for a character, the flag of which has already been set. If this flag is ON, it indicates the presence of the embedded font. On the other hand, if this flag is OFF, it indicates the absence of the embedded font. Upon setting the embed flag in the input character, that flag also serves as a flag indicating the presence/absence of execution of the embedded font processing (font setting processing). If the flag is ON, the embedded font processing such as selection of a font to be embedded in the input character and the like is executed. On the other hand, if the flag is OFF, the embedded font processing is skipped.

Furthermore, the characters present before and after the input character mean those which are located before and after the character input to a character string in the vertical direction or horizontal direction.

Figure 5A:
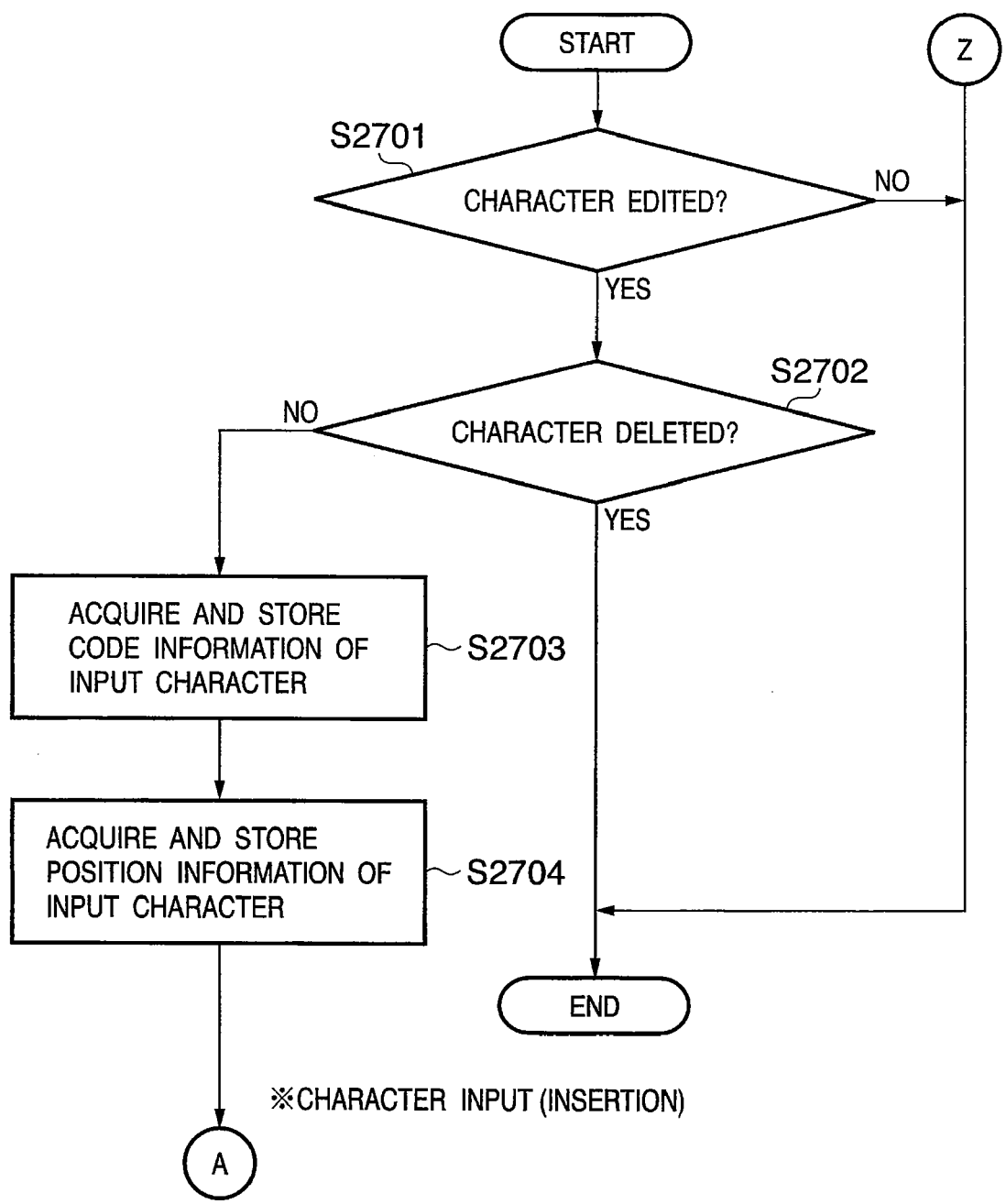
FIG. 5A is a flowchart showing character edit processing in the printing system according to the embodiment of the present invention.
Figure 5B:
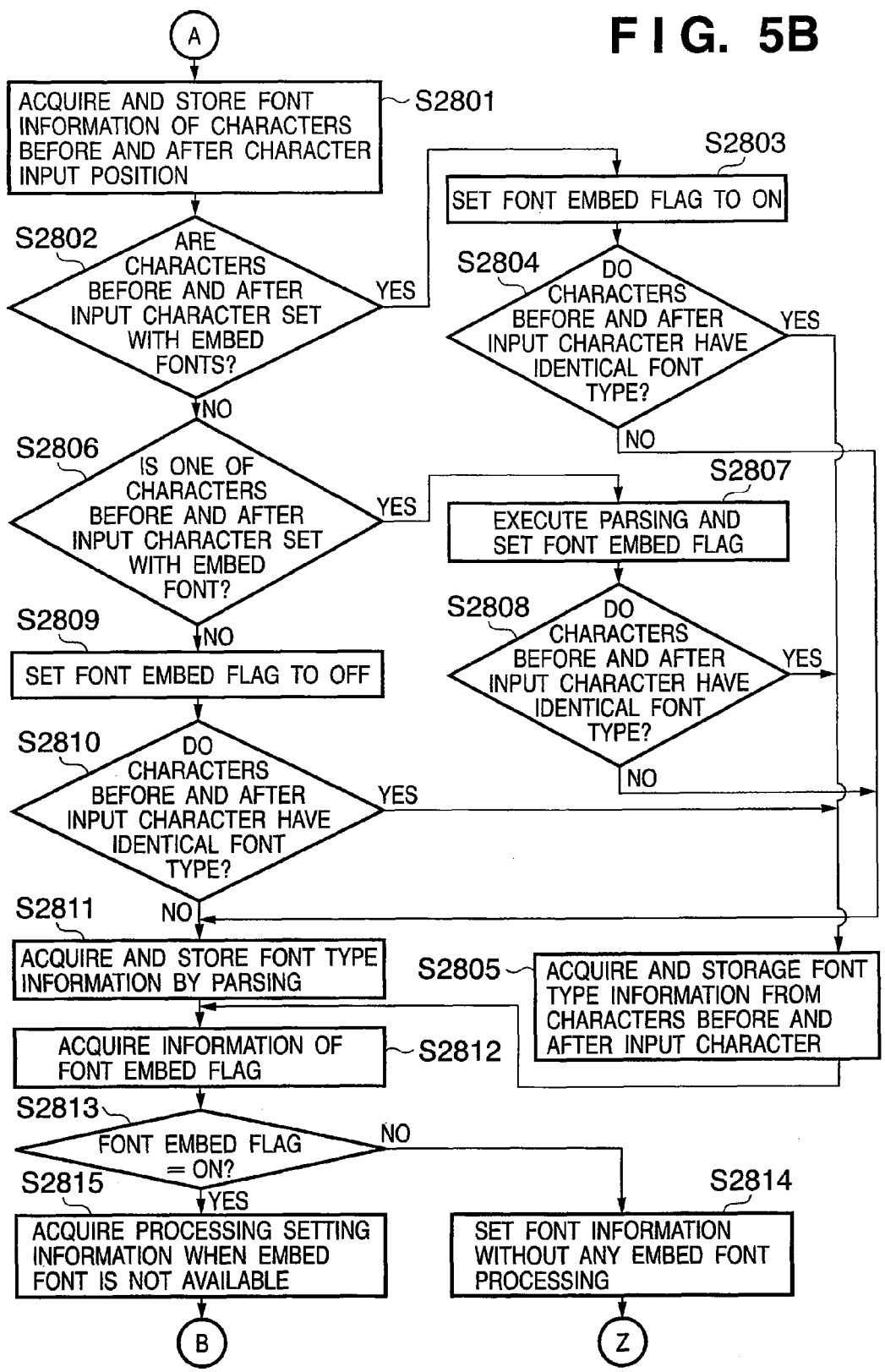
FIG. 5B is a flowchart showing character edit processing in the printing system according to the embodiment of the present invention.

A description of FIG. 5B will be given below.

The CPU 200 acquires the font information of the characters before and after the character input position from the RAM 202, and stores the acquired information in the input character information table 700 (step S2801). The CPU 200 determines based on the font information before the input character and that after the input character in the input character information table 700 if the embedded fonts are set for both the characters before and after the input character (step S2802). In the example of FIG. 6A, the CPU 200 determines that the embedded fonts are set for both the characters before and after the input character.

If it is determined that the embedded fonts are set for both the characters before and after the input character (YES in step S2802), the CPU 200 sets the font embed flag of the input character information table 700 to ON (step S2803).

The CPU 200 determines based on the font information before the input character and that after the input character in the input character information table 700 if the characters before and after the input character have the same font type (step S2804). In the example of FIG. 6A, the CPU 200 determines that the characters before and after the input character have the same font type.

The CPU 200 acquires font type information of the characters before and after the input character from the font information before the input character and that after the input character in the input character information table 700. The CPU 200 stores the acquired font type information in the input character font type information field of the input character information table 700 as that of the input character (step S2805). In the example of FIG. 6A, the CPU 200 sets "POP type" in the input character font type information field of the input character information table 700.

With the above processing, record No. 1 for the example of FIG. 6A is created in the input character information table 700.

Determination of the work contents in the character edit work and determination of the character addition position information will be described below using an example of FIG. 6B.

Figure 6B:
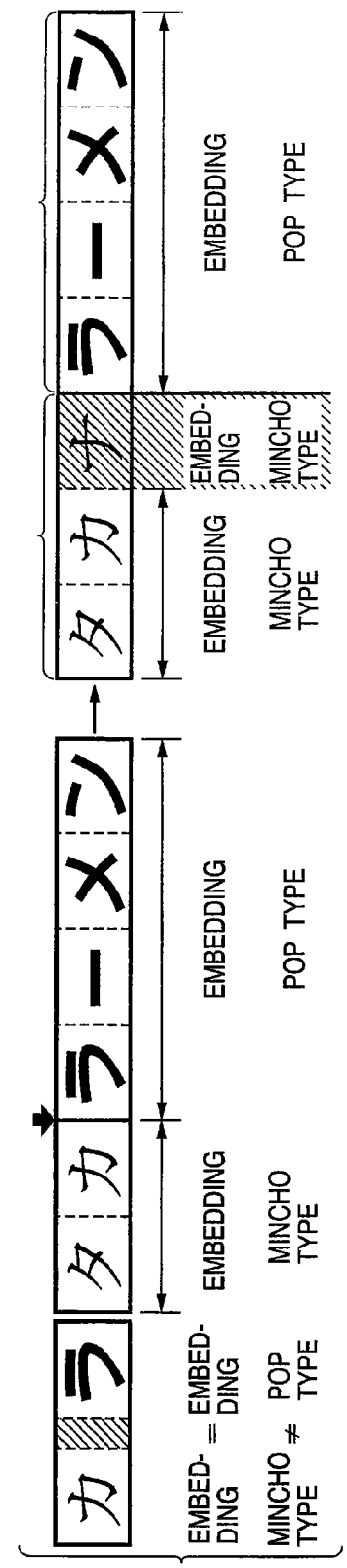

FIG. 6B shows an example in which "ナ" is missing from the position between "カ" and "ラ" in "タカラーメン" as a character string to be edited. In this example, all characters have embedding settings, and "Mincho type" is set as the font type information for characters "タカ", and "POP type" is set as that for characters "ラーメン".

Since the processes in steps S2701 to S2704 in the example of FIG. 6B are substantially the same as those in the example of FIG. 6A except for data to be stored in the input character information table 700, a description thereof will be omitted.

The CPU 200 acquires the font information of the characters before and after the character input position from the RAM 202, and stores the acquired information in the input character information table 700 (step S2801). The CPU 200 determines based on the font information before the input character and that after the input character in the input character information table 700 if the embedded fonts are set for both the characters before and after the input character (step S2802). In the example of FIG. 6B, the CPU 200 determines that the embedded fonts are set for both the characters before and after the input character.

If it is determined that the embedded fonts are set for both the characters before and after the input character (YES in step S2802), the CPU 200 sets the font embed flag of the input character information table 700 to ON (step S2803).

The CPU 200 determines based on the font information before the input character and that after the input character in the input character information table 700 if the characters before and after the input character have the same font type (step S2804). In the example of FIG. 6B, the CPU 200 determines that the characters before and after the input character do not have the same font type.

The CPU 200 acquires font type information to be set for the input character by an existing, general parsing technique, and stores it in the input character font type information field of the input character information table 700 (step S2811). More specifically, the CPU 200 parses the characters "タカナラーメン" to separate them into "タカナ" and "ラーメン". The CPU 200 parses that the input character "ラーメン" is a part of "ナ" acquires the font type information of "カ" before the input character from the input character information table 700, and sets "Mincho type" as the input character font type information of the input character "ナ" in the input character information table 700.

With the above processing, record No. 2 for the example of FIG. 6B is created on the input character information table 700.

Determination of the work contents in the character edit work and determination of the character addition position information will be described below using an example of FIG. 6C.

FIG. 6C shows an example in which "ツ" is missing from the position between "カ" and "ラ" in "トンカランチ" as a character string to be edited. In this example, characters "トンカ" have embedding settings, and characters "ランチ" have non-embedding settings. "POP type" is set as the font type information for all the characters.

Since the processes in steps S2701 to S2704 in the example of FIG. 6C are substantially the same as those in the example of FIG. 6A except for data to be stored in the input character information table 700, a description thereof will be omitted.

The CPU 200 acquires the font information of the characters before and after the character input position from the RAM 202, and stores the acquired information in the input character information table 700 (step S2801). The CPU 200 determines based on the font information before the input character and that after the input character in the input character information table 700 if the embedded fonts are set for both the characters before and after the input character (step S2802). In the example of FIG. 6C, the CPU 200 determines that the embedded fonts are not set for both the characters before and after the input character.

The CPU 200 determines based on the font information before the input character and that after the input character if the embedded font is set for one of the characters before and after the input character (step S2806). In the example of FIG. 6C, the CPU 200 determines that the embedded font is set for one of the characters before and after the input character.

The CPU 200 sets a font embed flag for the input character by an existing, general parsing technique (step S2807). More specifically, the CPU 200 parses the characters "トンカツランチ" to separate them into "トンカツ" and "ランチ" The CPU 200 parses that the input character "ツ" is a part of "トンカツ", and acquires the font type information of "カ" before the input character from the input character information table 700. The CPU 200 then sets an embed flag "ON" in this font type information as the embed information of the input character "ツ" in the font embed flag field of the input character information table 700.

The CPU 200 determines based on the font information before the input character and that after the input character in the input character information table 700 if the characters before and after the input character have the same font type (step S2808). In the example of FIG. 6C, the CPU 200 determines that the characters before and after the input character have the same font type. The CPU 200 acquires the font type information of the characters before and after the input character from the font information before the input character and that after the input character in the input character information table 700. The CPU 200 then stores the acquired font type information in the input character font type information field of the input character information table 700 as that of the input character (step S2805). In the example of FIG. 6C, the CPU 200 sets "POP type" in the input character font type information field of the input character information table 700.

With the above processing, record No. 3 for the example of FIG. 6C is created in the input character information table 700.

Determination of the work contents in the character edit work and determination of the character addition position information will be described below using an example of FIG. 6D.

FIG. 6D shows an example in which "ニ" is missing from the position between "カ" and "ラ" in "ゴウカラレバ" as a character string to be edited. In this example, characters "ゴウカ" have embedding settings, and characters "ラレバ" have non-embedding settings. "POP type" is set as the font type information for the characters "ゴウカ" and "Mincho type" is set as that for the characters "ラレバ".

Since the processes in steps S2701 to S2704 in the example of FIG. 6D are substantially the same as those in the example of FIG. 6A except for data to be stored in the input character information table 700, a description thereof will be omitted.

The CPU 200 acquires the font information of the characters before and after the character input position from the RAM 202, and stores the acquired information in the input character information table 700 (step S2801). The CPU 200 determines based on the font information before the input character and that after the input character in the input character information table 700 if the embedded fonts are set for both the characters before and after the input character (step S2802). In the example of FIG. 6D, the CPU 200 determines that the embedded fonts are not set for both the characters before and after the input character.

The CPU 200 determines based on the font information before the input character and that after the input character if the embedded font is set for one of the characters before and after the input character (step S2806). In the example of FIG. 6D, the CPU 200 determines that the embedded font is set for one of the characters before and after the input character.

The CPU 200 sets a font embed flag for the input character by an existing, general parsing technique (step S2807). More specifically, the CPU 200 parses the characters "ゴウカニラレバ" to separate them into "ゴ" and "ニラレバ". The CPU 200 parses that the input character "ニ" is a part of "ゴ" and acquires the font type information of "ラ" after the input character from the input character information table 700. The CPU 200 then sets an embed flag "OFF" in this font type information as the embed information of the input character "ニ" in the font embed flag field of the input character information table 700.

The CPU 200 determines based on the font information before the input character and that after the input character in the input character information table 700 if the characters before and after the input character have the same font type (step S2808). In the example of FIG. 6D, the CPU 200 determines that the characters before and after the input character do not have the same font type.

The CPU 200 acquires font type information to be set for the input character by an existing, general parsing technique, and stores it in the input character font type information field of the input character information table 700 (step S2811). More specifically, the CPU 200 parses the characters "ゴウカニラレバ" to separate them into "ゴ" and "ニラレバ". The CPU 200 parses that the input character "ニ" is a part of "ニラレバ", acquires the font type information of "ラ" after the input character from the input character information table 700, and sets "Mincho type" as the input character font type information of the input character "ニ" in the input character information table 700.

With the above processing, record No. 4 for the example of FIG. 6D is created on the input character information table 700.

Determination of the work contents in the character edit work and determination of the character addition position information will be described below using an example of FIG. 6E.

Figure 6E:
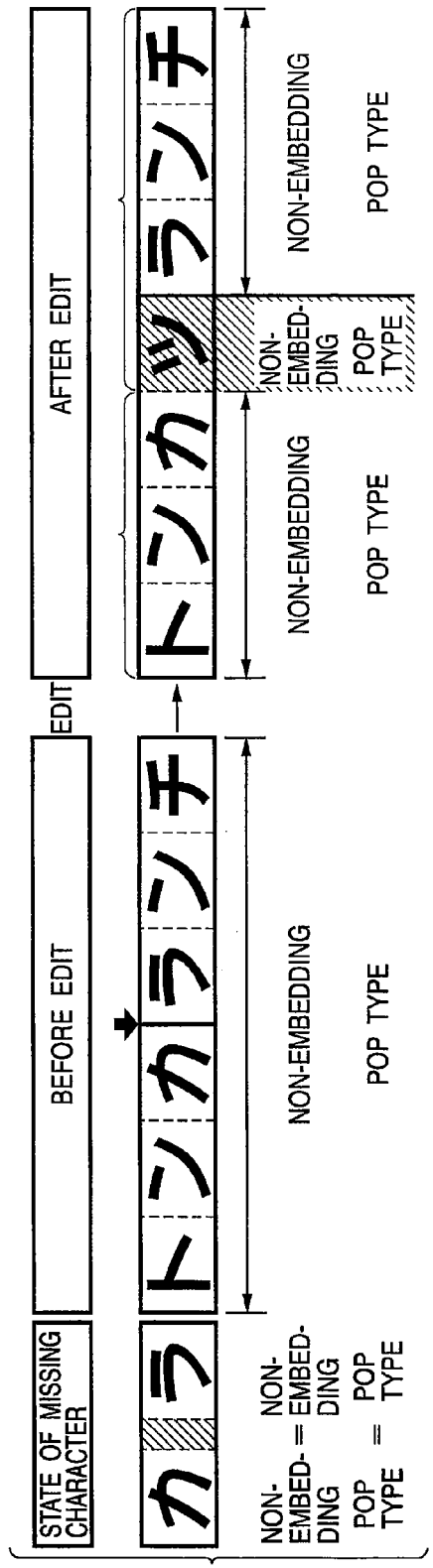

FIG. 6E shows an example in which "ツ" is missing from the position between "カ" and "ラ" in "タカラーメン" as a character string to be edited. In this example, all the characters have non-embedding settings, and "POP type" is set as the font type information for all the characters.

Since the processes in steps S2701 to S2704 in the example of FIG. 6E are substantially the same as those in the example of FIG. 6A except for data to be stored in the input character information table 700, a description thereof will be omitted.

The CPU 200 acquires the font information of the characters before and after the character input position from the RAM 202, and stores the acquired information in the input character information table 700 (step S2801). The CPU 200 determines based on the font information before the input character and that after the input character in the input character information table 700 if the embedded fonts are set for both the characters before and after the input character (step S2802). In the example of FIG. 6E, the CPU 200 determines that the embedded fonts are not set for both the characters before and after the input character.

The CPU 200 determines based on the font information before the input character and that after the input character if the embedded font is set for one of the characters before and after the input character (step S2806). In the example of FIG. 6E, the CPU 200 determines that the embedded font is not set for one of the characters before and after the input character.

If it is determined that the embedded font is set for none of the characters before and after the input character, the CPU 200 sets the font embed flag for the input character to OFF (step S2809). More specifically, the CPU 200 sets "OFF" in the font embed flag field of the input character information table 700.

The CPU 200 determines based on the font information before the input character and that after the input character in the input character-information table 700 if the characters before and after the input character have the same font type (step S2810). In the example of FIG. 6E, the CPU 200 determines that the characters before and after the input character have the same font type. The CPU 200 acquires the font type information of the characters before and after the input character from the font information before the input character and that after the input character in the input character information table 700. The CPU 200 then stores the acquired font type information in the input character font type information field of the input character information table 700 as that of the input character (step S2805). In the example of FIG. 6E, the CPU 200 sets "POP type" in the input character font type information field of the input character information table 700.

With the above processing, record No. 5 for the example of FIG. 6E is created in the input character information table 700.

Determination of the work contents in the character edit work and determination of the character addition position information will be described below using an example of FIG. 6F.

Figure 6F:
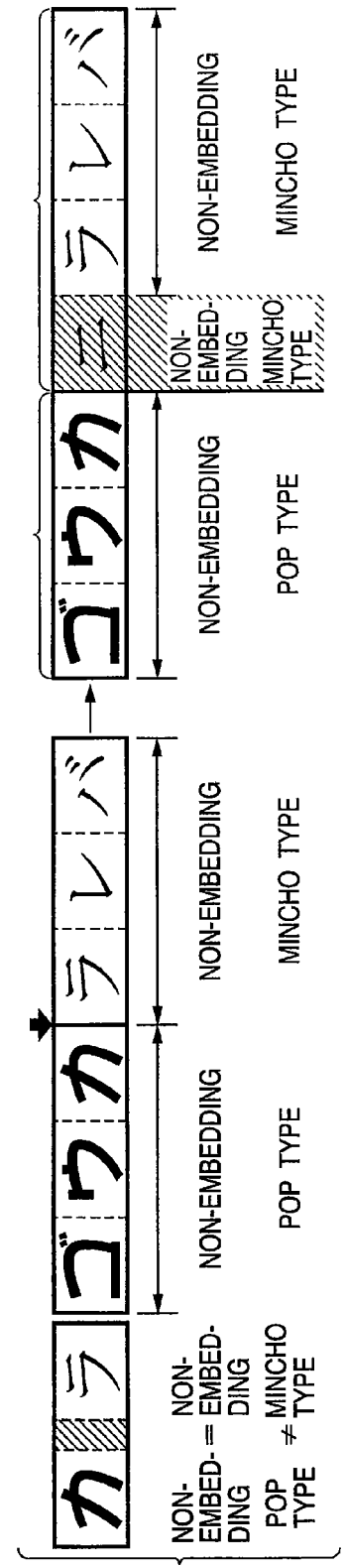
Figure 6G:
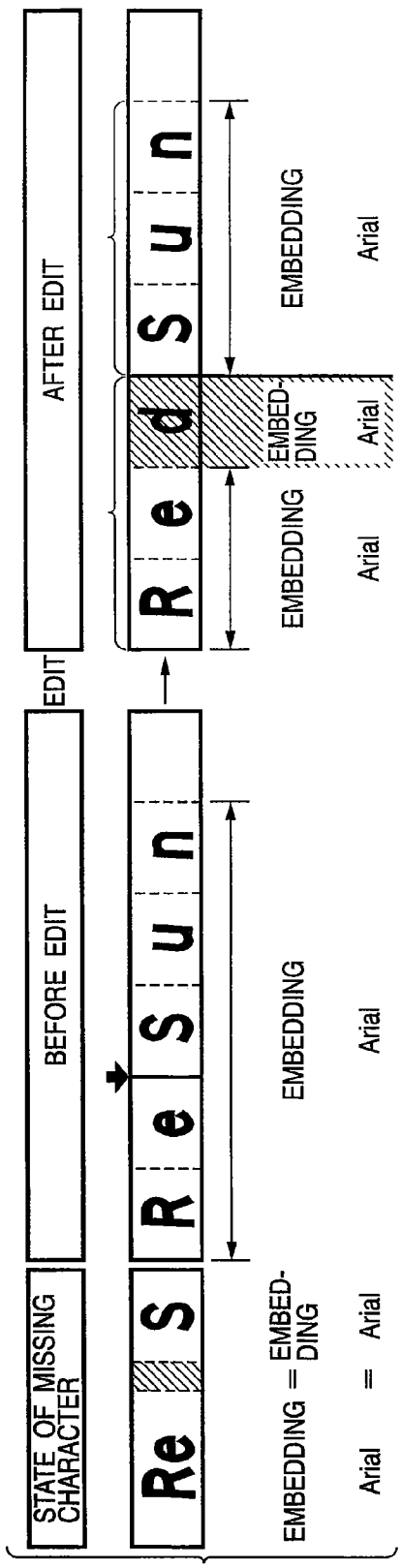
Figure 6H:
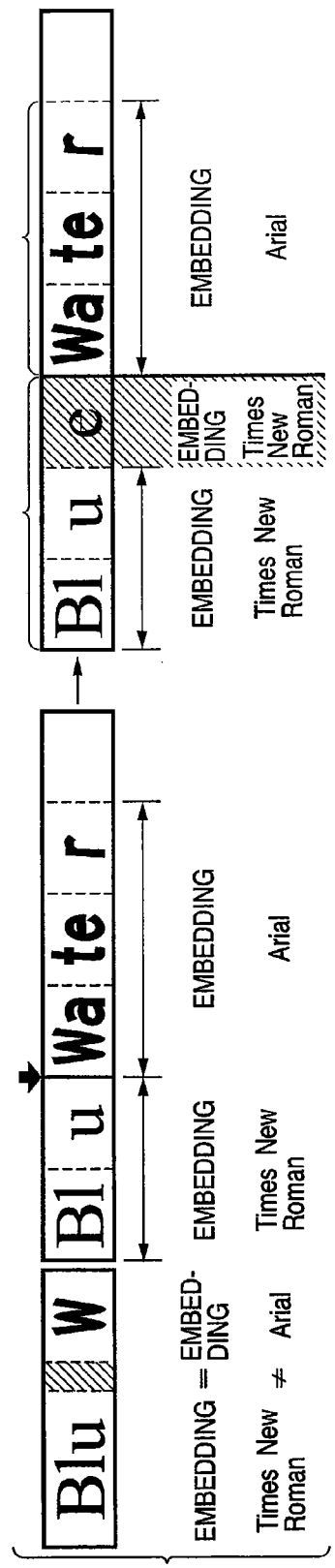
Figure 6I:
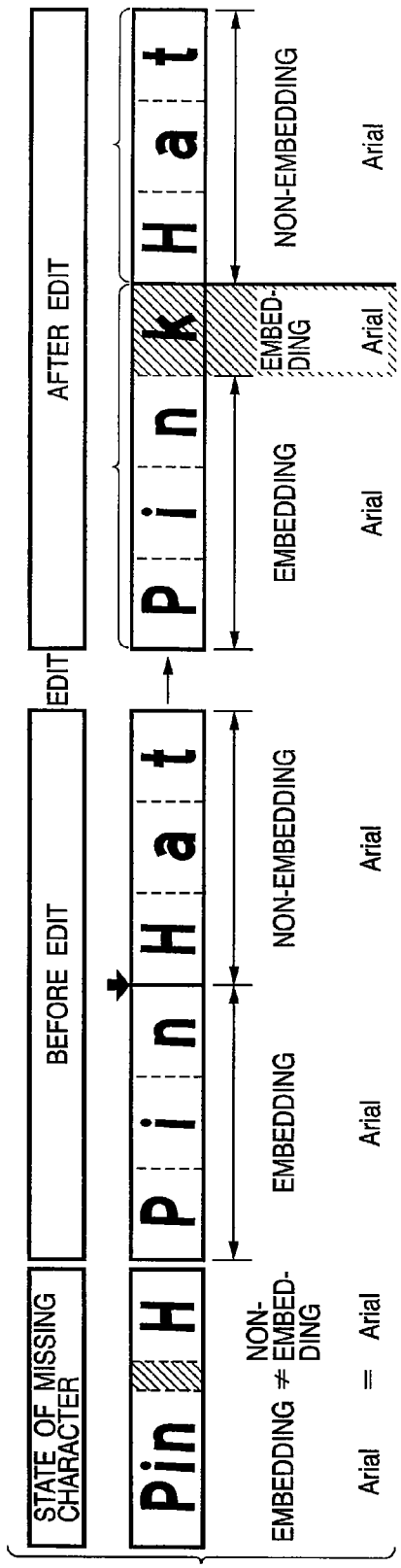
Figure 6J:
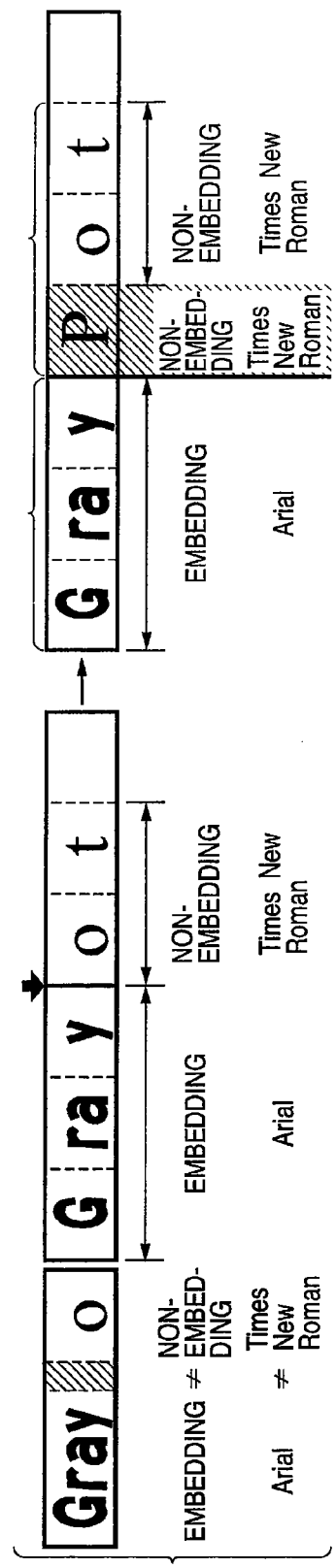

FIG. 6F shows an example in which "ニ" is missing from the position between "ゴウカラレバ" and "カ" in "ラ" as a character string to be edited. In this example, all the characters have non-embedding settings. "POP type" is set as the font type information for the characters "ゴウカ", and "Mincho type" is set as that for the characters "ラレバ".

Since the processes in steps S2701 to S2704 in the example of FIG. 6F are substantially the same as those in the example of FIG. 6A except for data to be stored in the input character information table 700, a description thereof will be omitted.

The CPU 200 acquires the font information of the characters before and after the character input position from the RAM 202, and stores the acquired information in the input character information table 700 (step S2801). The CPU 200 determines based on the font information before the input character and that after the input character in the input character information table 700 if the embedded fonts are set for both the characters before and after the input character (step S2802). In the example of FIG. 6F, the CPU 200 determines that the embedded fonts are not set for both the characters before and after the input character.

The CPU 200 determines based on the font information before the input character and that after the input character if the embedded font is set for one of the characters before and after the input character (step S2806). In the example of FIG. 6F, the CPU 200 determines that the embedded font is not set for one of the characters before and after the input character.

If it is determined that the embedded font is set for none of the characters before and after the input character, the CPU 200 sets the font embed flag for the input character to OFF (step S2809). More specifically, the CPU 200 sets "OFF" in the font embed flag field of the input character information table 700.

The CPU 200 determines based on the font information before the input character and that after the input character in the input character information table 700 if the characters before and after the input character have the same font type (step S2810). In the example of FIG. 6F, the CPU 200 determines that the characters before and after the input character do not have the same font type.

The CPU 200 acquires font type information to be set for the input character by an existing, general parsing technique, and stores it in the input character font type information field of the input character information table 700 (step S2811). More specifically, the CPU 200 parses the characters "ゴウカニラレバ" separate them into "ゴウカ" and "=ラレバ". The CPU 200 parses that the input character "ニ" is a part of "=ラレバ". acquires the font type information of "ラ" after the input character from the input character information table 700, and sets "Mincho type" as the input character font type information of the input character "ニ" in the input character information table 700.

With the above processing, record No. 6 for the example of FIG. 6F is created in the input character information table 700 in FIG. 7.

Next, the CPU 200 acquires the font embed flag information of the input character information table 700 (step S2812).

The CPU 200 determines if the acquired font embed flag is ON (step S2813). In the examples of FIGS. 6D, 6E, and 6F, the font embed flag of the input character information table 700 is OFF. In this case, the CPU 200 determines that the font embed flag is not ON. Then, the CPU 200 sets font information without executing the processing of the embedded font (step S2814). After that, the CPU 200 ends the processing.

On the other hand, in the examples of FIGS. 6A, 6B, and 6C, the font embed flag of the input character information table 700 is ON. In this case, the CPU 200 determines that the font embed flag is ON.

The CPU 200 then acquires, from the RAM 202, information of processing settings when no embedded font is available, which is set in advance by the operator using a processing setting dialog 800 (FIG. 8) (step S2815).

The processing setting dialog used to make processing settings when no embedded font is available will be described below using FIG. 8.

Figure 8:
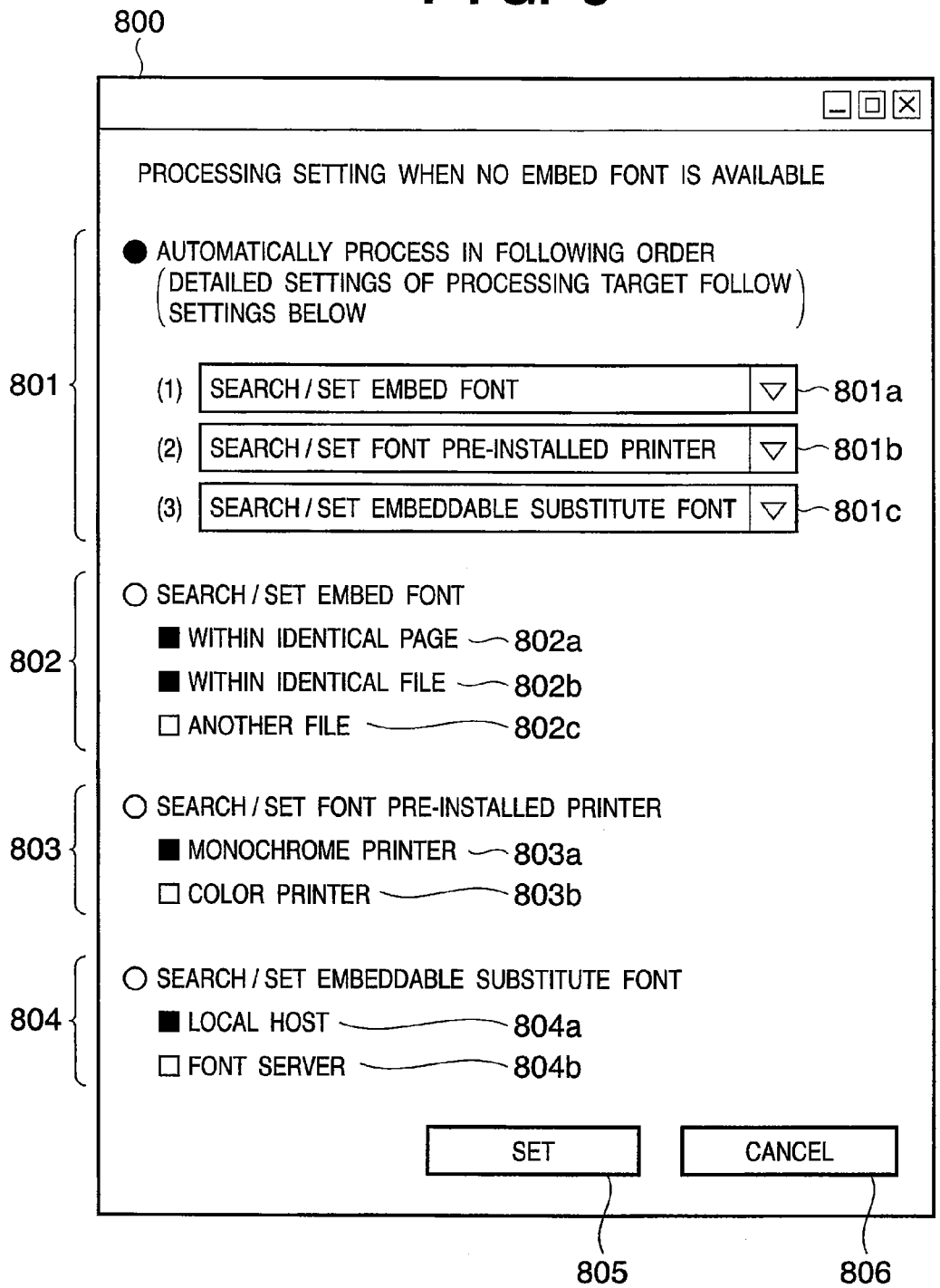
FIG. 8 shows an example of a processing setting dialog according to the embodiment of the present invention.

FIG. 8 shows an example of the processing setting dialog according to the embodiment of the present invention.

The processing setting dialog 800 includes setting items used to make processing settings (settings of the processing contents) of font setting processing to be executed when no embedded font is available. These setting items include various controls such as pull-down menus, radio buttons, check boxes, and the like.

Items 801 to 804 are configured by radio buttons, and the operator can select one of these radio buttons.

The item 801 is selected to automatically execute the processing when no embedded font is available, in the order of setting contents designated using pull-down menus 801a to 801c. These pull-down menus 801a to 801c are registered with the following items 802 to 804, and the operator can select one of these items.

The item 802 is used to search/set an embedded font. Furthermore, items 802a to 802c used to designate the search/set target range are configured using check boxes. That is, the operator can select one or more items from the items 802a to 802c.

The item 802a is used to designate, as the search/set target range, "within identical page" to that including a character to be processed. The item 802b is used to designate, as the search/set target range, "within identical file" to that including a character to be processed. The item 802c is used to designate, as the search/set target range, "another file" other than that including a character to be processed.

The item 803 is used to search/set a font pre-installed printer. Furthermore, items 803a and 803b used to designate the search/set target range are configured using check boxes. That is, the operator can select one or more items from the items 803a and 803b.

The item 803a is used to designate "monochrome printer" as the search/set target range. The item 803b is used to designate "color printer" as the search/set target range.

The item 804 is used to search/set an embeddable substitute font. Furthermore, items 804a and 804b used to designate the search/set target range are configured using check boxes. That is, the operator can select one or more items from the items 804a and 804b.

The item 804a is used to designate "local host" as the search/set target range. The item 804b is used to designate "font server" as the search/set target range.

A set button 805 is used to settle the settings on the processing setting dialog 800. Upon pressing this button 805, the settings on the processing setting dialog 800 are stored in the RAM 202 as the processing setting information. A cancel button 806 is used to cancel the settings on the processing setting dialog 800.

Figure 5C:
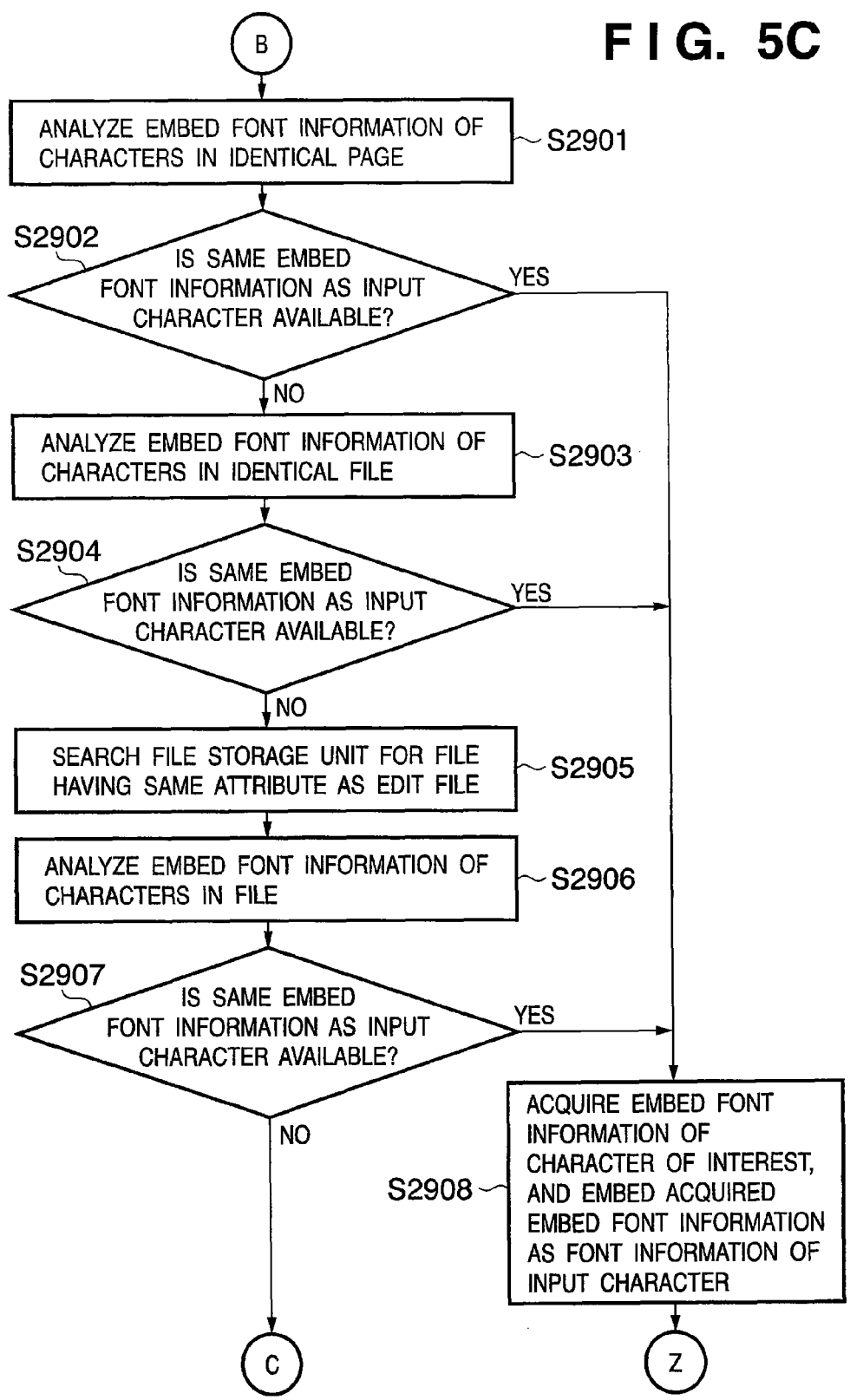
FIG. 5C is a flowchart showing character edit processing in the printing system according to the embodiment of the present invention.

On the processing setting dialog 800, when the operator sets the item 802 "search/set embedded font", the CPU 202 executes only steps S2901 to S2908 in FIG. 5C. With this item, the operator can individually set "within identical page", "within identical file", or "another file" as the search/set range, as described above.

Figure 5D:
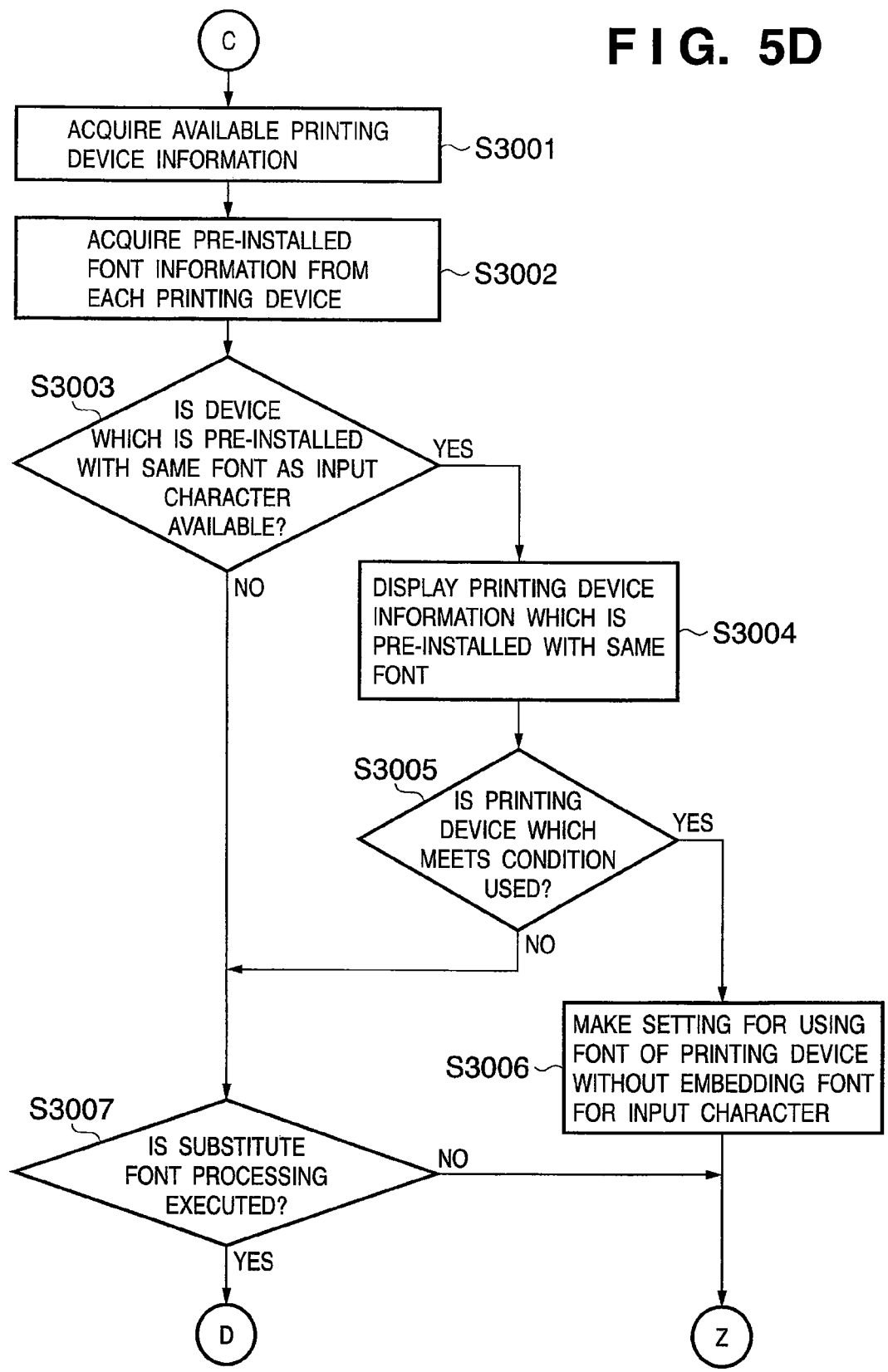
FIG. 5D is a flowchart showing character edit processing in the printing system according to the embodiment of the present invention.

On the processing setting dialog 800, when the operator sets the item 803 "search/set font pre-installed printer", the CPU 202 executes only steps S3001 to S3007 in FIG. 5D. With this item, the operator can individually set "monochrome printer" or "color printer" as the search/set range, as described above.

Figure 5E:
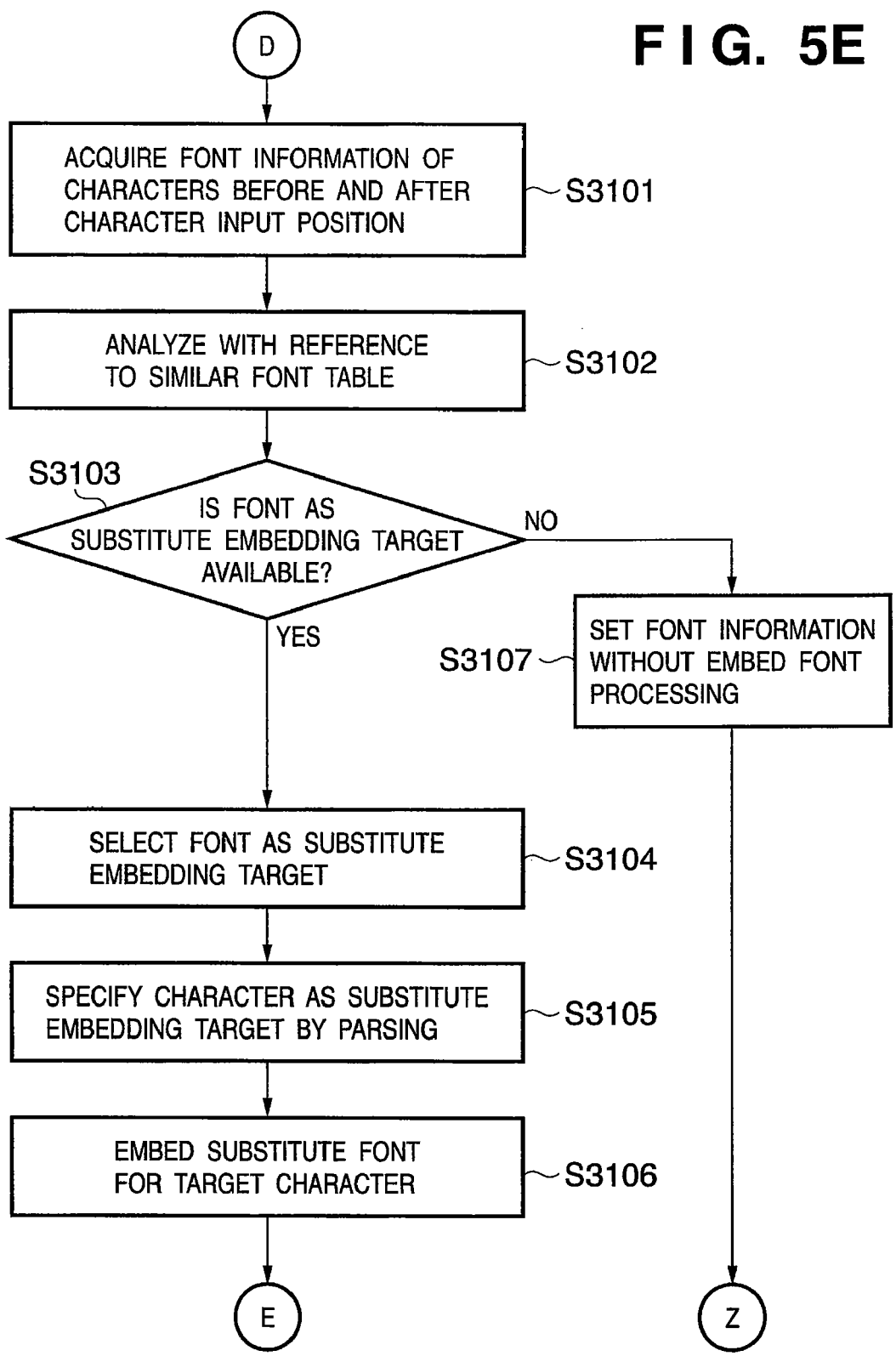
FIG. 5E is a flowchart showing character edit processing in the printing system according to the embodiment of the present invention.

On the processing setting dialog 800, when the operator sets the item 804 "search/set embeddable substitute font", the CPU 202 executes only steps S3101 to S3107 in FIG. 5E. With this item, the operator can individually set "local host" or "font server" (including various kinds of file servers) as the search/set range, as described above.

In this embodiment, the processing to be executed when the operator sets the item 801 "automatically process in following order" in the setting state on the processing setting dialog 800 will be described below. In this case, the CPU 200 executes steps S2901 to S2908 (FIG. 5C), then executes steps S3001 to S3007 (FIG. 5D), and finally executes steps S3101 to S3107 (FIG. 5E).

Since the processing in step S2901 and subsequent steps is common to the examples of FIGS. 6A, 6B, and 6C, the following explanation will be given using the example of FIG. 6A.

Figure 9:
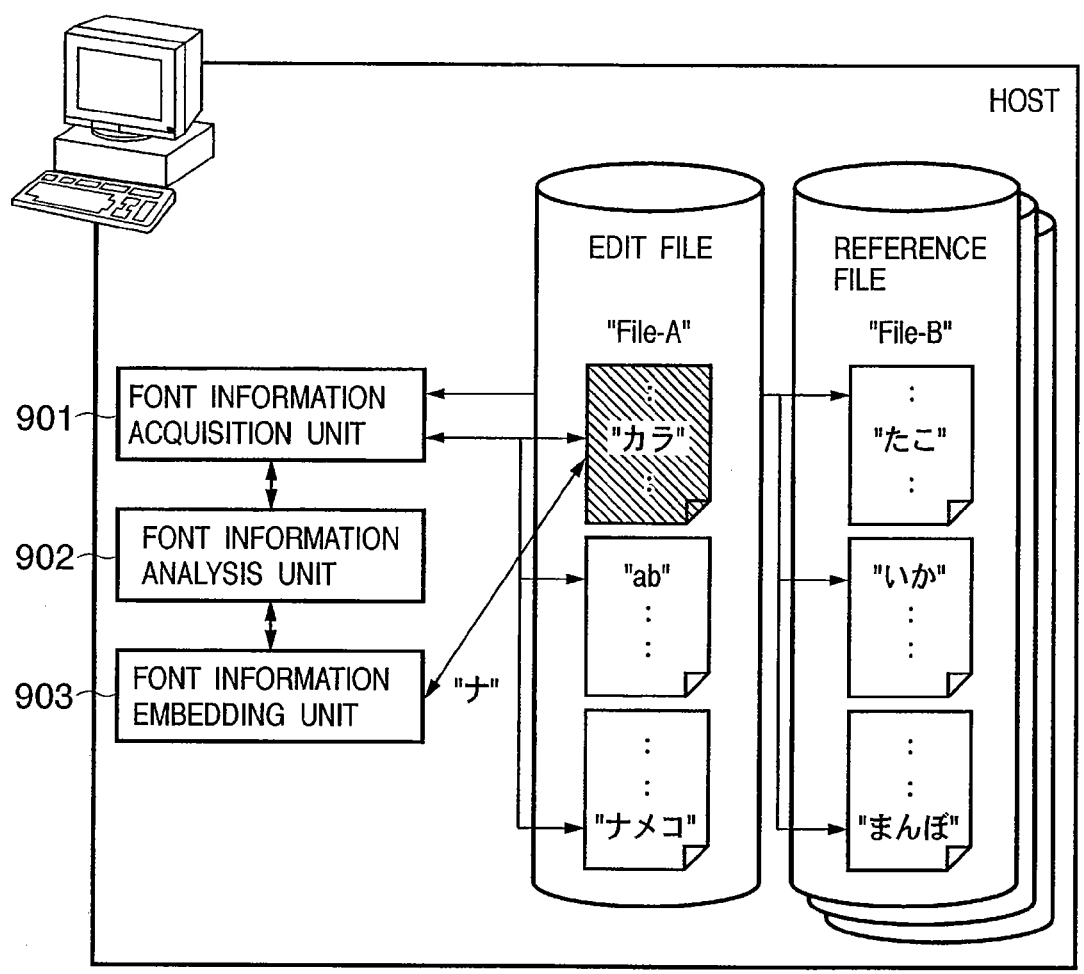
FIG. 9 is a diagram showing the functional arrangement of the system according to the embodiment of the present invention.

The CPU 200 acquires various kinds of document information of an edit file stored in the RAM 202 using a font information acquisition unit 901 shown in FIG. 9 as a functional module which runs after being loaded onto the RAM 202. The CPU 202 analyzes embedded font information of characters within an identical page to that of the input character using a font information analysis unit 902 (step S2901).

The CPU 200 determines if the same embedded font information as that of the input character is available (step S2902). In the example of FIG. 6A and FIG. 9, the CPU 200 determines if a character "ナ" whose font type is "POP type" is available within the identical page. If it is determined that the same embedded font information as that of the input character is available (YES in step S2902), the CPU 200 acquires the embedded font information of the corresponding character using the font information acquisition unit 901. Then, the CPU 202 embeds the acquired font information in various kinds of document information of the edit file as that of the input character using a font information embedding unit 903 (step S2908). After that, the CPU 200 ends the processing.

In this case, an appropriate font is embedded in only the input character.

On the other hand, if it is determined that the same embedded font information as that of the input character is not available (NO in step S2902), the CPU 202 acquires various kinds of document information of the edit file stored in the RAM 202 using the font information acquisition unit 901. Then, the CPU 202 analyzes embedded font information of characters within an identical file to that of the input character using the font information analysis unit 902 (step S2903).

The CPU 200 determines if the same embedded font information as that of the input character is available (step S2904). In the example of FIG. 6A and FIG. 9, the CPU 200 determines if a character "ナ" whose font type is "POP type" is available within the identical file. If it is determined that the same embedded font information as that of the input character is available (YES in step S2904), the CPU 200 acquires the embedded font information of the corresponding character using the font information acquisition unit 901. Then, the CPU 202 embeds the acquired font information in various kinds of document information of the edit file as that of the input character using the font information embedding unit 903 (step S2908). The CPU 200 ends the processing.

In this case as well, an appropriate font is embedded in only the input character.

Upon determination in step S2904 if the same embedded font information as that of the input character is stored in a file, if its font format is different although the found information has the same font type, the CPU 200 determines that the same embedded font information is not available. For example, this is the case wherein a POP type font in the Macintosh font format is embedded in a file, the OS of the host is Windows®, and only POP type of the Windows® font format is available.

If it is determined in step S2904 that the same embedded font information as that of the input character is not available (NO in step S2904), the CPU 200 searches files. More specifically, the CPU 200 searches a file storage unit (e.g., the HD 205) for a file having the same attribute as that of the file to be edited using the font information acquisition unit 901 (step S2905). That is, the CPU 200 refers to a file attribute table 1000 (FIG. 10) stored in the HD 205 to acquire the attribute of the edit file and those of a reference file group (FIG. 9) stored in the file storage unit. The CPU 200 then analyzes the presence/absence of the same attribute.

The file attribute table 1000 will be described below using FIG. 10.

Figure 10:
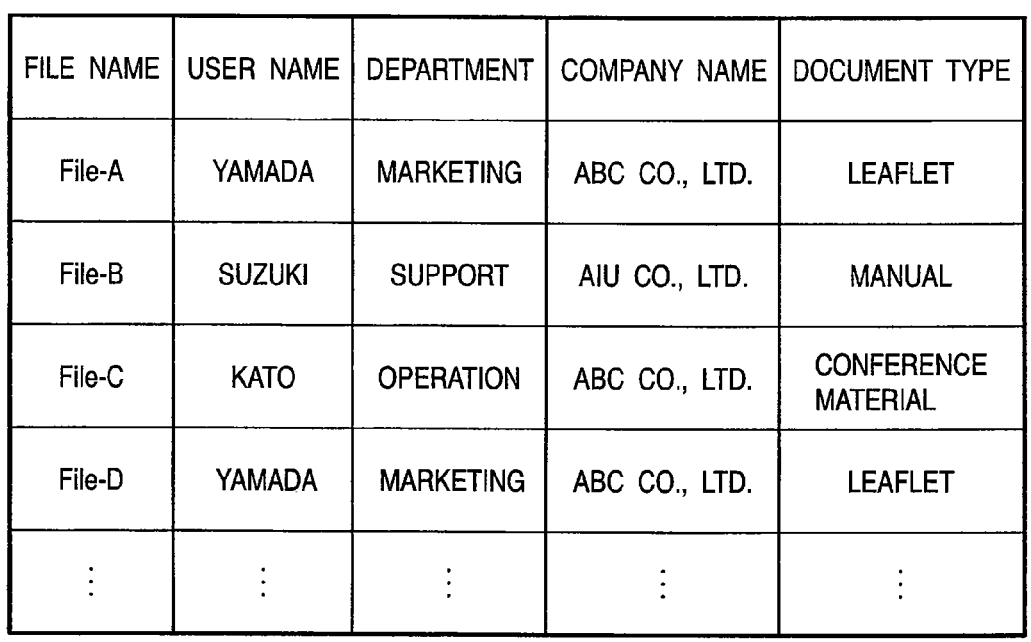
FIG. 10 shows an example of a file attribute table according to the embodiment of the present invention.

FIG. 10 shows an example of the file attribute table according to the embodiment of the present invention.

The file attribute table 1000 is used to manage information associated with files, and is stored on, e.g., the HD 205. In this embodiment, as shown in FIG. 10, the table 1000 manages, as file attributes, a file name, a user name as a creator of that file, department and company names to which that user belongs, and a document type.

The description will revert to FIG. 5C.

The CPU 200 analyzes the embedded font information of characters in each file in descending order of the number of items of the same attributes using the font information acquisition unit 901 (step S2906).

The CPU 200 determines if the same embedded font information as that of the input character is available (step S2907). In the example of FIG. 6A and FIG. 9, the CPU 200 determines if a character "ナ" whose font type is "POP type" is available in each reference file. If it is determined that the same embedded font information as that of the input character is available (YES in step S2907), the CPU 200 acquires the embedded font information of the corresponding character using the font information acquisition unit 901. The CPU 200 embeds the acquired font information in various kinds of document information of the edit file as information of the input character using the font information embedding unit 903 (step S2908), thus ending the processing.

In this case as well, an appropriate font is embedded in only the input character.

Upon determination in step S2907 if the same embedded font information as that of the input character is stored in a host, if its font format is different although the found information has the same font type, the CPU 200 determines that the same embedded font information is not available. For example, this is the case wherein a POP type font in the Macintosh font format is embedded in a file, the OS of the host is Windows®, and only POP type of the Windows® font format is available.

If it is determined in step S2907 that the same embedded font information as that of the input character is not available (NO in step S2907), the CPU 200 executes the processing in step S3001 and subsequent steps in FIG. 5D, since it cannot embed only the input character.

Figure 11:
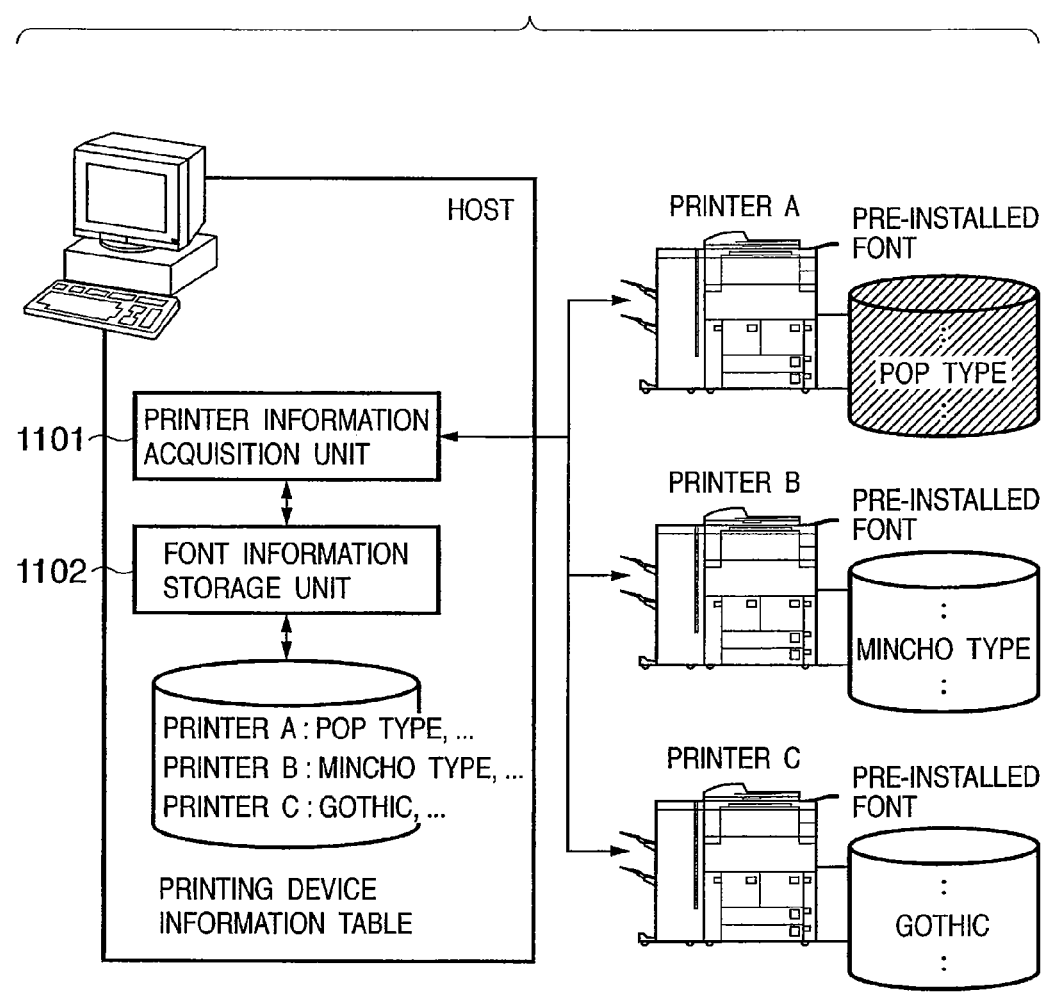
FIG. 11 is a diagram showing the functional arrangement of the system according to the embodiment of the present invention.

The CPU 200 acquires printing device information of available printing devices connected via the network I/F 209 using a printer information acquisition unit 1101 shown in FIG. 11, as a functional module which runs after being loaded onto the RAM 202 (step S3001). More specifically, the CPU 200 acquires required printing device information with reference to a printing device information table 1200 (FIG. 12) stored in the HD 205. In this case, the CPU 200 stores font information in the acquired printing device information in the printing device information table 1200 using a font information storage unit 1102.

After that, the CPU 200 acquires pre-installed font information from each printing device based on the printing device information table 1200 (step S3002).

The printing device information table 1200 will be described below using FIG. 12.

FIG. 12 shows an example of the printing device information table according to the embodiment of the present invention.

The printing device information table 1200 is used to manage information associated with printing devices, and is stored on, e.g., the HD 205. In this embodiment, the table 1200 manages, as printing device information, printer names, IP addresses, processing capabilities, support paper sizes, finishing functions (double-sided, collate, staple, etc.), paper feed units, and font information of various printers.

The description will revert to FIG. 5D.

The CPU 200 determines if a device which is installed with the same font as that of the input character is available (step S3003). In the example of FIG. 6A, the CPU 200 determines if a font of "POP type" is installed in each printing device. If it is determined that the same font as that of the input character is installed in a given printing device, the CPU 200 displays printing device information of the printing device which is installed with the font of interest on a printer selection dialog 1300 (FIG. 13) (step S3004).

The printer selection dialog 1300 will be described below using FIG. 13.

Figure 13:
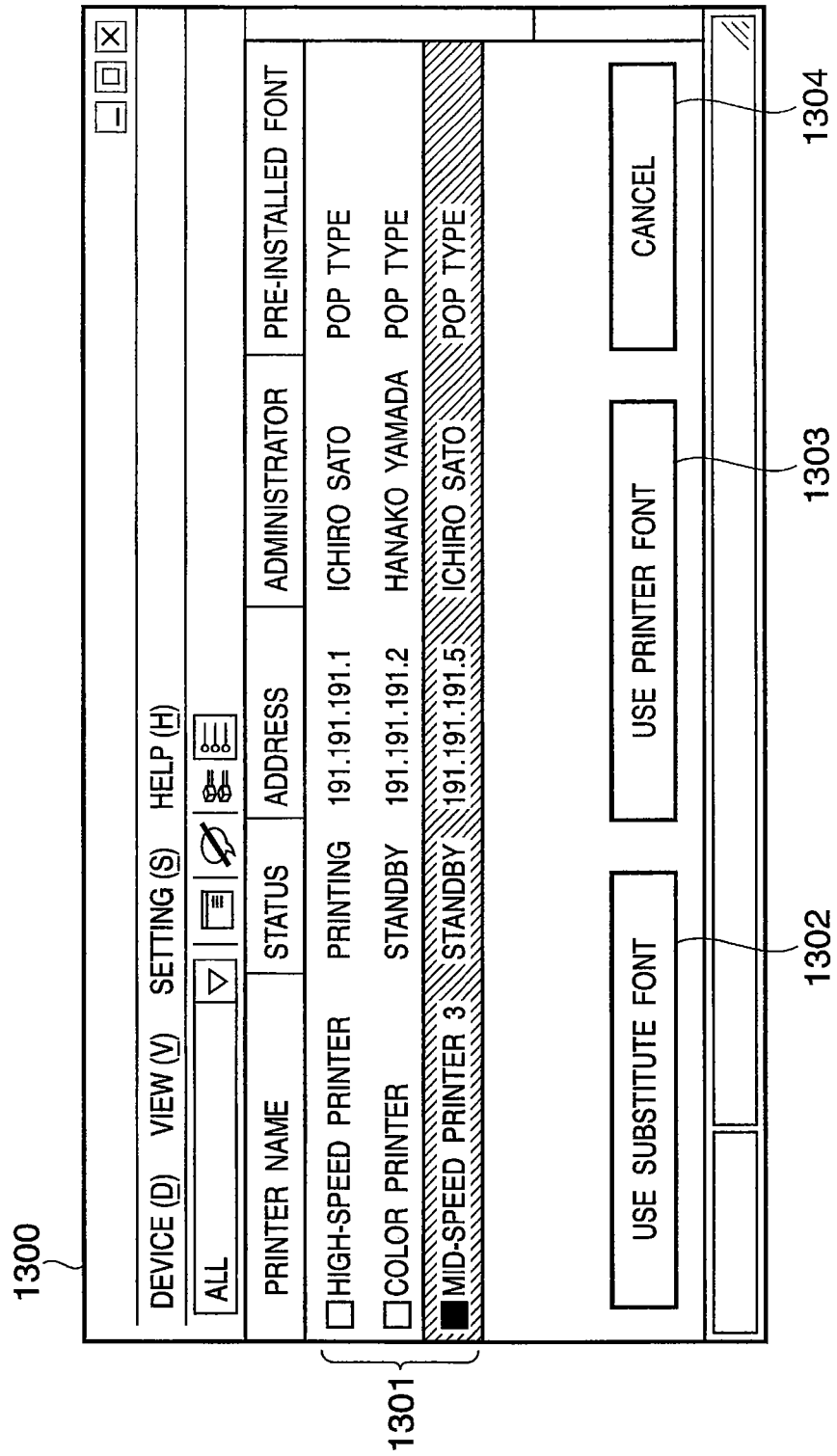
FIG. 13 shows an example of a printer selection dialog according to the embodiment of the present invention.

FIG. 13 shows an example of the printer selection dialog according to the embodiment of the present invention.

The printer selection dialog 1300 includes information associated with printers specified by the printing device information and buttons used to make settings for a printer to be processed.

A printer list 1301 displays information of various printers specified by the printing device information. The operator can select a desired printer from this printer list 1301.

The operator presses a "use substitute font" button 1302 upon using a substitute font as a font of the character to be processed.

The operator presses a "use printer font" button 1303 upon using a printer font of the printer selected on the printer list 1301 as a font of the character to be processed.

The operator presses a cancel button 1304 upon quitting display of the printer selection dialog 1300.

The description will revert to FIG. 5D.

The CPU 200 determines if the operator has selected use of a printing device which satisfies conditions using a peripheral device (step S3005). The CPU 200 attains this determination processing based on the operation on the printer selection dialog 1300 (FIG. 13) by the operator. Especially, when the operator selects an arbitrary printer and presses the "use printer font" button 1303, the CPU 200 determines that the operator has selected the printing device which satisfies the conditions. In this case, the CPU 200 skips the font embedding processing for the input character and executes settings that use a font of the printing device (step S3006). The CPU 200 then ends the processing.

If it is determined in step S3005 that the operator does not press the "use printer font" button 1303, the CPU 200 determines if the operator has selected processing of a substitute font using a peripheral device (step S3007). The CPU 200 attains this determination processing based on the operation on the printer selection dialog 1300 (FIG. 13) by the operator. In this case, if the operator presses the "cancel" button 1304 on the printer selection dialog 1300, the CPU 200 ends the processing.

If it is determined in step S3007 that the operator presses the "use substitute button" 1302, the CPU 200 executes the processing in step S3101 and subsequent steps in FIG. 5E.

Figure 14:
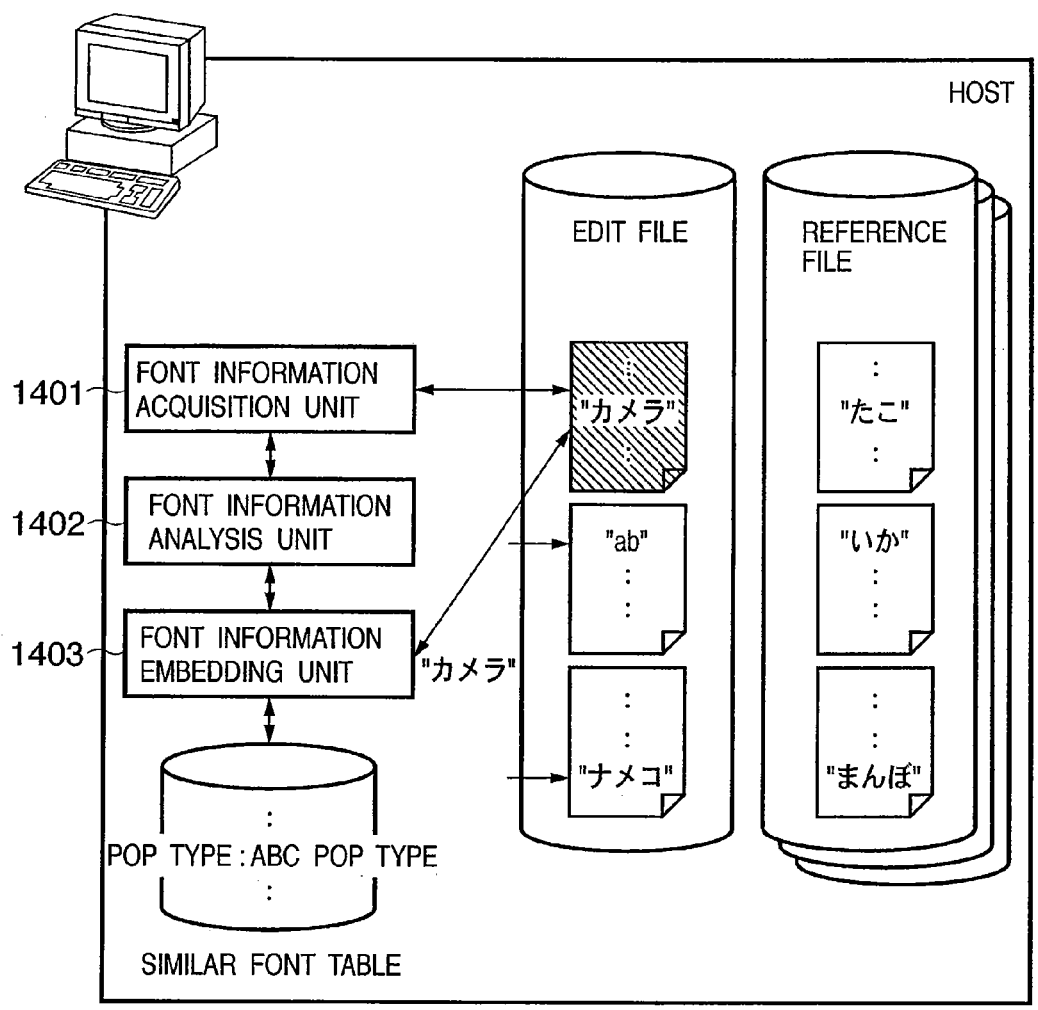
FIG. 14 is a diagram showing the functional arrangement of the system according to the embodiment of the present invention.

The CPU 200 acquires font information of the characters before and after the character input position with reference to the input character information table 700 using a font information acquisition unit 1401 in FIG. 14 as a functional module which runs after being loaded onto the RAM 202 (step S3101). The CPU 200 analyzes the acquired font information with reference to a similar font table 1500 (FIG. 15) using a font information analysis unit 1402 (step S3102).

The similar font table 1500 will be described below using FIG. 15.

FIG. 15 shows an example of the similar font table according to the embodiment of the present invention.

The similar font table 1500 is used to manage information of font types and substitute font types which substitute them, and is stored on, e.g., the HD 205. As shown in FIG. 15, the table 1500 manages font types to be substituted (target fonts) and actual substitute fonts (normally, font types similar to the target fonts). In addition, the table 1500 manages the status of font embed flags for the substitute fonts.

As a practical example of the processing in step S3102, the CPU 200 acquires "POP type" as the font information of the characters before and after the character input position, and obtains an analysis result indicating that "ABC POP type" as a similar font of "POP type" is embeddable as a substitute font. The CPU 200 stores "ABC POP type" as a substitute font in an input character substitute font table 1600 (FIG. 16) on the RAM 202.

The input character substitute font table 1600 will be described below using FIG. 16.

FIG. 16 shows an example of the input character substitute font table according to the embodiment of the present invention.

Figure 17:
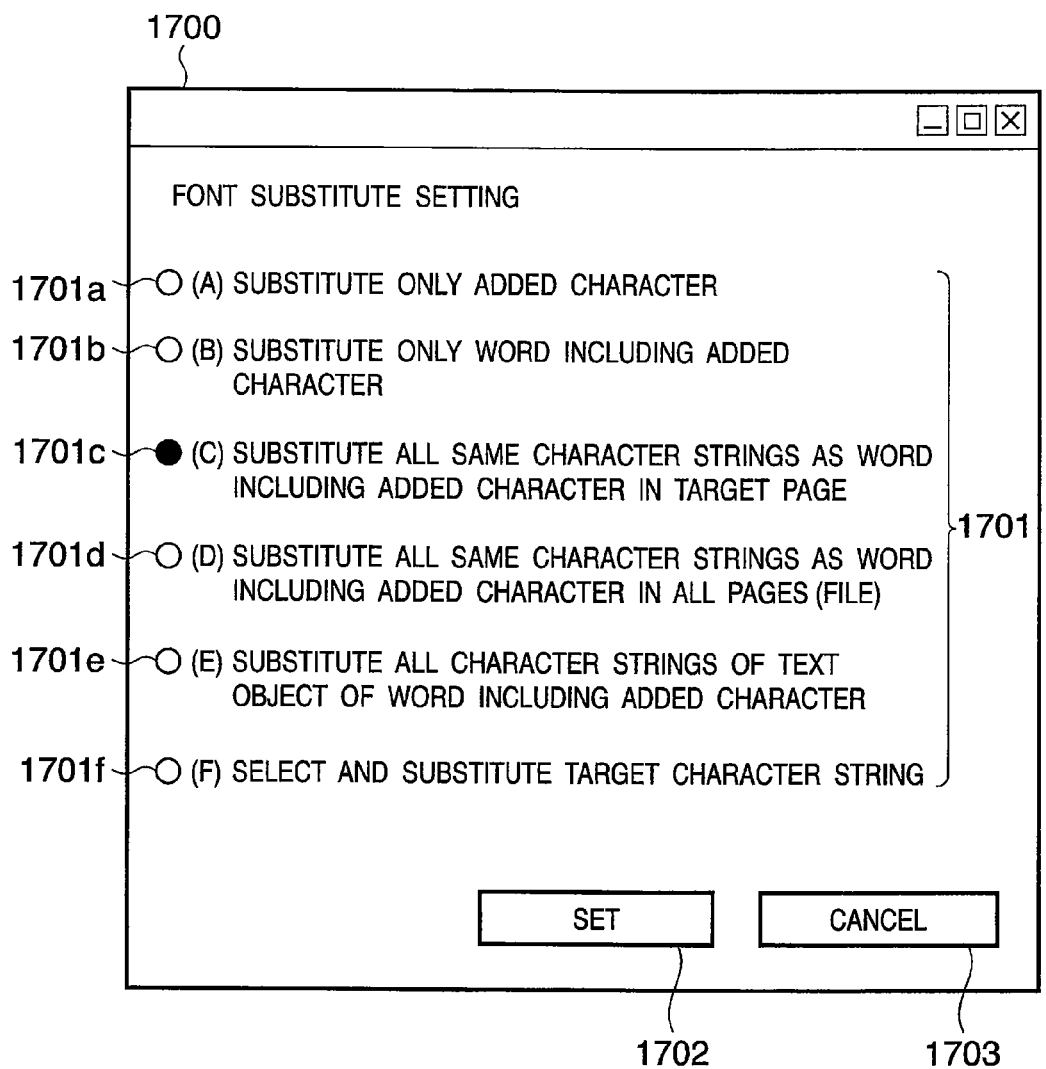
FIG. 17 shows an example of a font substitution setting dialog according to the embodiment of the present invention.

The input character substitute font table 1600 manages substitute font information specified by analysis in step S3102, and font substitute setting information set on a font substitute setting dialog 1700 (FIG. 17; to be described later). The input character substitute font table 1600 is stored on, e.g., the HD 205.

As shown in FIG. 16, the table 1600 manages font types of substitute fonts, target characters to be substituted, and information about the target characters.

The description will revert to FIG. 5E.

The CPU 200 determines if a font as a substitute font to be embedded is available (step S3103). If it is determined that a font as a substitute font to be embedded is not available (NO in step S3103), the CPU 200 skips the embedded font processing, and sets font information (step S3107). The CPU 200 then ends the processing.

In this case, the CPU 200 obtains the analysis result in step S3102 indicating that "ABC POP type" stored in the input character substitute font table 1600 is embeddable as a substitute font. Hence, the CPU 200 selects "ABC POP type" as a substitute font to be embedded (step S3104).

The CPU 200 acquires font substitute setting information, which is set in advance by the operator on the font substitute setting dialog 1700 (FIG. 17), from the RAM 202. The CPU 200 specifies a character, in which the substitute font is to be embedded, by a general parsing technique in accordance with the acquired font substitute setting information (step S3105).

The font substitute setting dialog 1700 will be described below using FIG. 17.

FIG. 17 shows an example of the font substitute setting dialog according to the embodiment of the present invention.

The font substitute setting dialog 1700 includes setting items required to make font substitute settings for a character to be processed.

An item 1700 is configured by a plurality of different radio buttons, and allows the operator to select one of them. Especially, this item 1701 includes a plurality of different font substitute setting items 1701a to 1701f.

The font substitute setting item 1701a is used to substitute the font of only a character to be processed (added character) by a font pre-installed in the printing device.

The font substitute setting item 1701b is used to substitute the fonts of only a word including the character to be processed (added character) by a font pre-installed in the printing device.

The font substitute setting item 1701c is used to substitute the fonts of all the same character strings in a target page as a word including the character to be processed (added character) by a font pre-installed in the printing device.

The font substitute setting item 1701d is used to substitute the fonts of all the same character strings in all pages (file) as a word including the character to be processed (added character) by a font pre-installed in the printing device.

The font substitute setting item 1701e is used to substitute the fonts of a text object of a word including the character to be processed (added character) to a font pre-installed in the printing device.

The font substitute setting item 1701f is used to select a target character string and to substitute the fonts of the selected character string to a font pre-installed in the printing device.

A set button 1702 is used to settle the settings on the font substitute setting dialog 1700. Upon pressing of this button 1702, the CPU 200 stores the settings on the font substitute setting dialog 1700 in the RAM 202 as the font substitute setting information. A cancel button 1703 is used to cancel the settings on the font substitute setting dialog 1700.

A practical example will be described below. For example, the operator has selected the font substitute setting item 1701c "(C) substitute all the same character strings in target page as word including added character". In the example of FIG. 6A, the CPU 200 selects all character strings "タカナ" in the same page as that including the character "ナ" at a position, where the character is input by parsing, as characters which are to undergo substitute embedding. The CPU 200 stores information "タカナ" as the target characters in the input character substitute font table 1600 on the RAM 202.

The parsing and font substitute settings in step S3105 will be supplementarily explained using arbitrary characters.

Figure 18A:
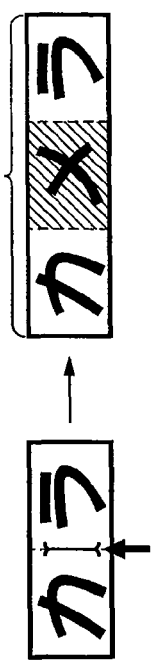
FIGS. 18A to 18F are views for character edit examples according to the embodiment of the present invention.
Figure 18B:
Figure 18C:
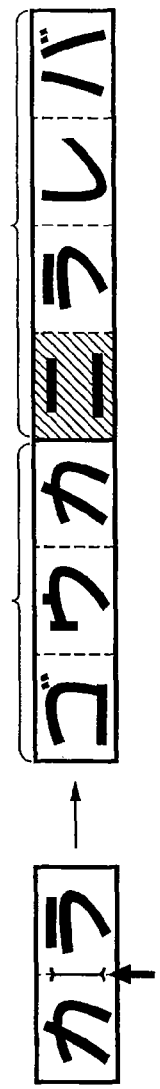

For example, upon parsing a character string in FIG. 18A, "カメラ". including an input character "メ" is determined as a word. Upon parsing a character string in FIG. 18B, "タカナ" and "ラーメン". including an input character "ナ" are determined as words. Upon parsing a character string in FIG. 18C, "ナ" and "ニラレバ" including an input character "ニ" are determined as words.

Figure 18D:
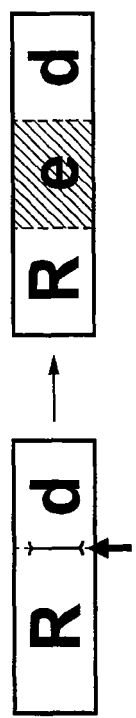
Figure 18E:
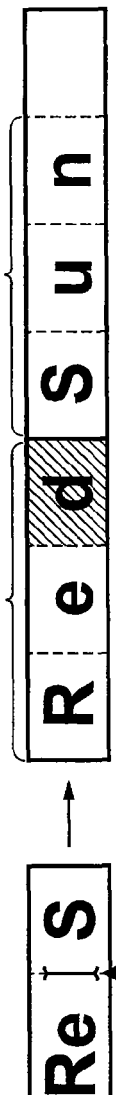
Figure 18F:
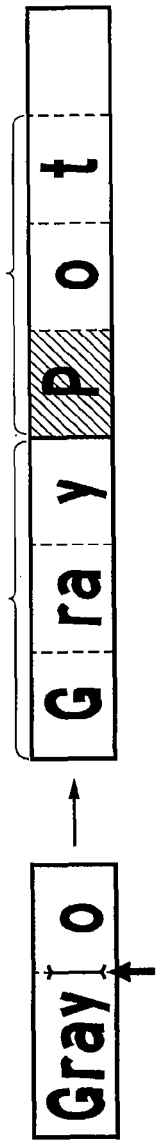

FIGS. 18D to 18F show examples in which character strings to be processed are alphabets. Upon parsing a character string in FIG. 18D, "Red" including an input character "e" is determined as a word. Upon parsing a character string in FIG. 18E, "Red" and "Sun" including an input character "d" are determined as words. Upon parsing a character string in FIG. 18F, "Gray" and "Pot" including an input character "P" are determined as words.

Figure 19A:
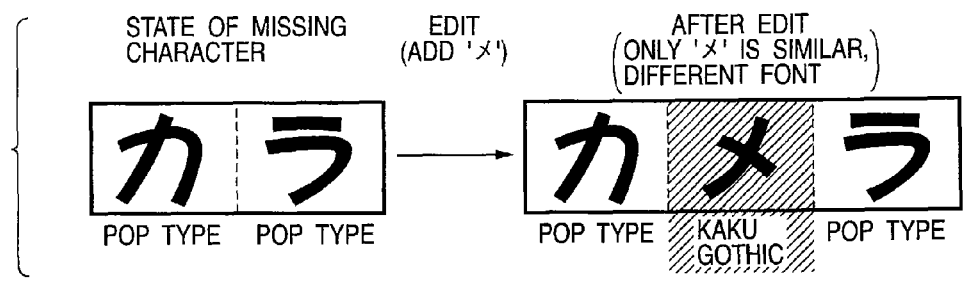
FIGS. 19A to 19D are views for character edit examples according to the embodiment of the present invention.
Figure 19B:
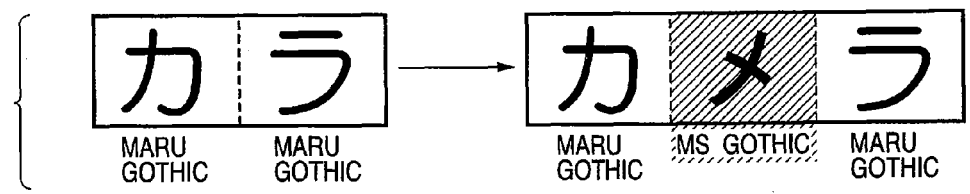
Figure 19C:
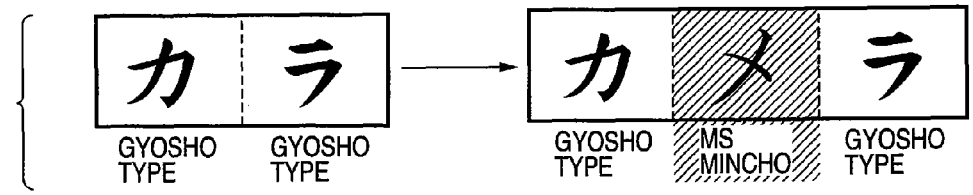
Figure 19D:
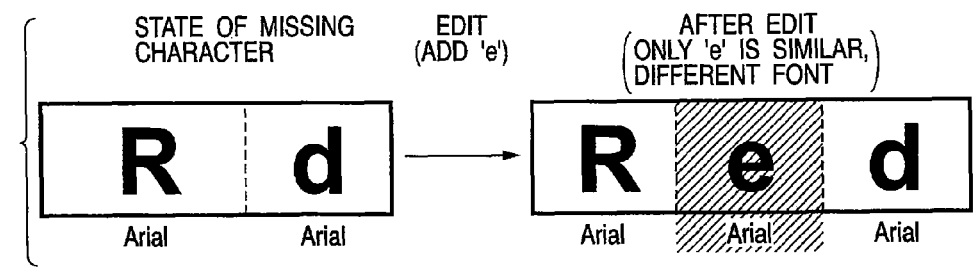

In FIG. 18A, and when the operator has selected the font substitute setting item 1701a "(A) substitute only added character" on the font substitute setting dialog 1700, the CPU 200 selects only the character "メ" as a character which is to undergo substitute embedding, as shown in FIGS. 19A to 19C. Also, the CPU 200 selects only the character "メ" at a position where the character is input as a character which is to undergo substitute embedding. When the character type to be processed is an alphabet, the CPU 200 selects only the character "e" as a character which is to undergo substitute embedding, as shown in FIG. 19D.

Figure 20A:
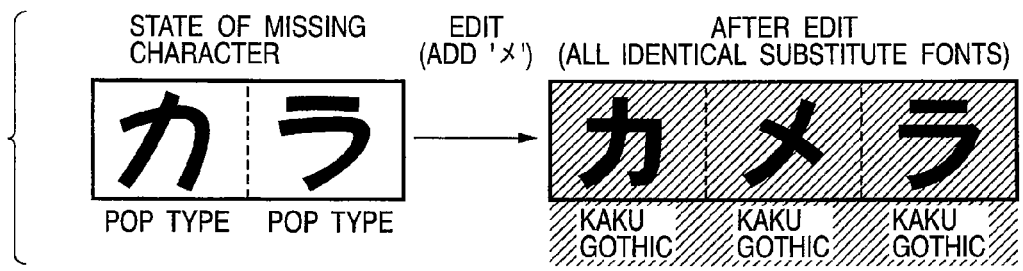
FIGS. 20A to 20D are views for character edit examples according to the embodiment of the present invention.
Figure 20B:
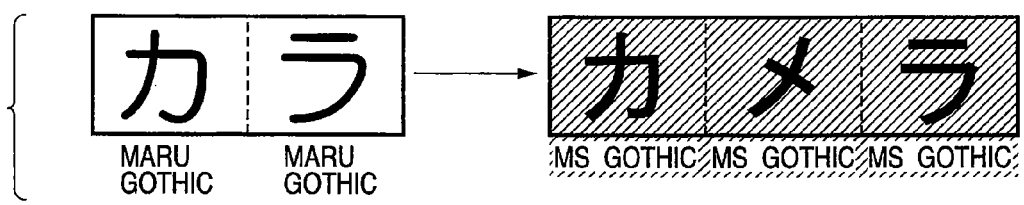
Figure 20C:
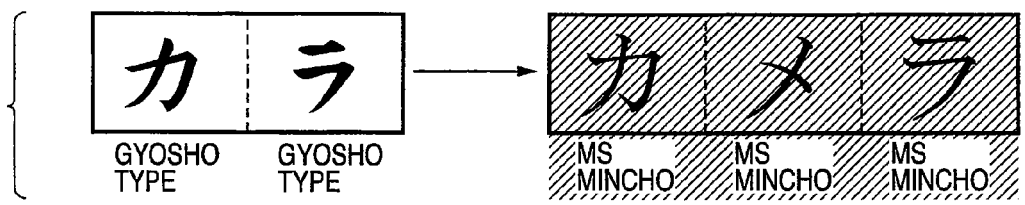
Figure 20D:
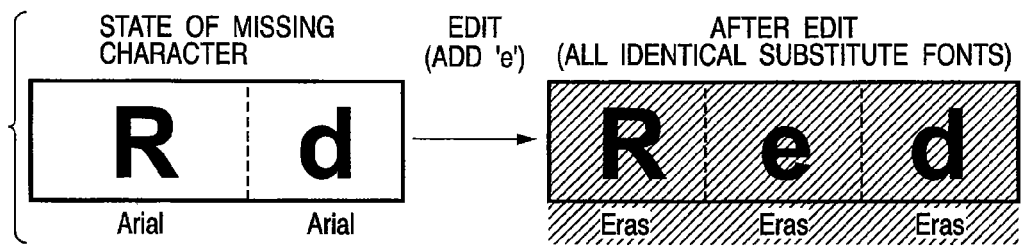

In FIG. 18A, and when the operator has selected the font substitute setting item 1701b "(B) substitute only word including added character" on the font substitute setting dialog 1700, the CPU 200 recognizes "カメラ". as one word, as shown in FIGS. 20A to 20C. Then, the CPU 200 selects the character string "カメラ". as that which is to undergo substitute embedding. Also, the CPU selects only the character string "カメラ". including the character "メ" at a position, where the character is input, as that which is to undergo substitute embedding. When the character type to be processed is an alphabet, the CPU 200 selects only "Red" including the character "e" at a position where the character is input as a character which is to undergo substitute embedding, as shown in FIG. 20D.

Figure 21A:
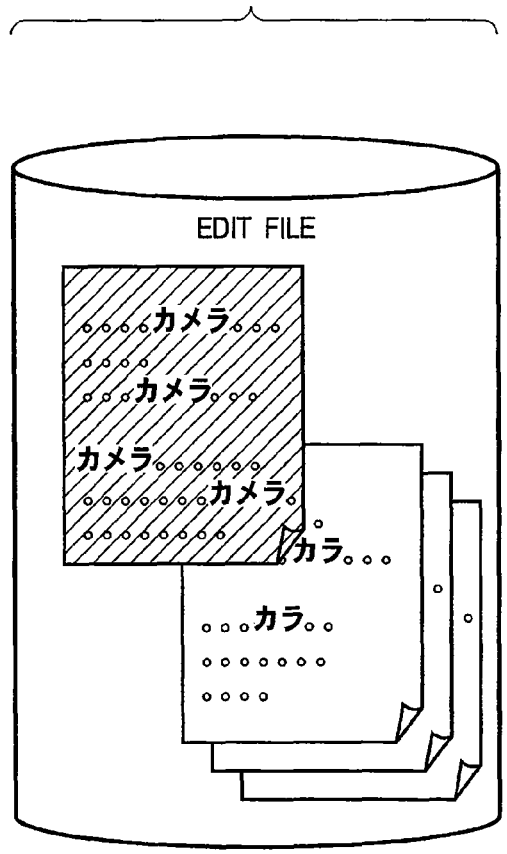
FIGS. 21A and 21B are views for explaining the concept of the processing contents according to the embodiment of the present invention.

In FIG. 18A, and when the operator has selected the font substitute setting item 1701c "(C) substitute all same character strings as word including added character in target page" on the font substitute setting dialog 1700, the CPU 200 executes the following processing. That is, the CPU 200 recognizes "カメラ". as one word, and selects the character string "カメラ". as that which is to undergo substitute embedding, as shown in FIGS. 20A to 20C. Then, the CPU 200 selects not only the character string "カメラ". including the character "メ" at a position where the character is input, but also all the character strings "カメラ". in the same page as that of the character "メ" at a position where the character is input the character as those which are to undergo substitute embedding, as shown in FIG. 21A.

Figure 21B:
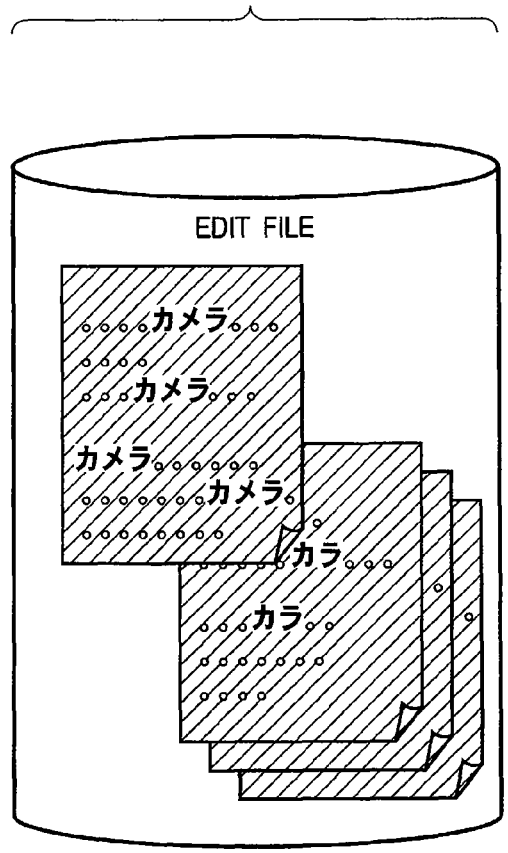

In FIG. 18A, and when the operator has selected the font substitute setting item 1701d "(D) substitute all same character strings as word including added character in all pages (file)" on the font substitute setting dialog 1700, the CPU 200 executes the following processing. That is, the CPU 200 recognizes "カメラ". as one word, and selects the character string "カメラ". as that which is to undergo substitute embedding, as shown in FIGS. 20A to 20C. Then, the CPU 200 selects not only the character string "カメラ". including the character "メ" at a position where the character is input, but also all the character strings "カメラ". in the same file as that of the character "メ" at a position where the character is input the character as those which are to undergo substitute embedding, as shown in FIG. 21B.

Figures 22A, 22B:
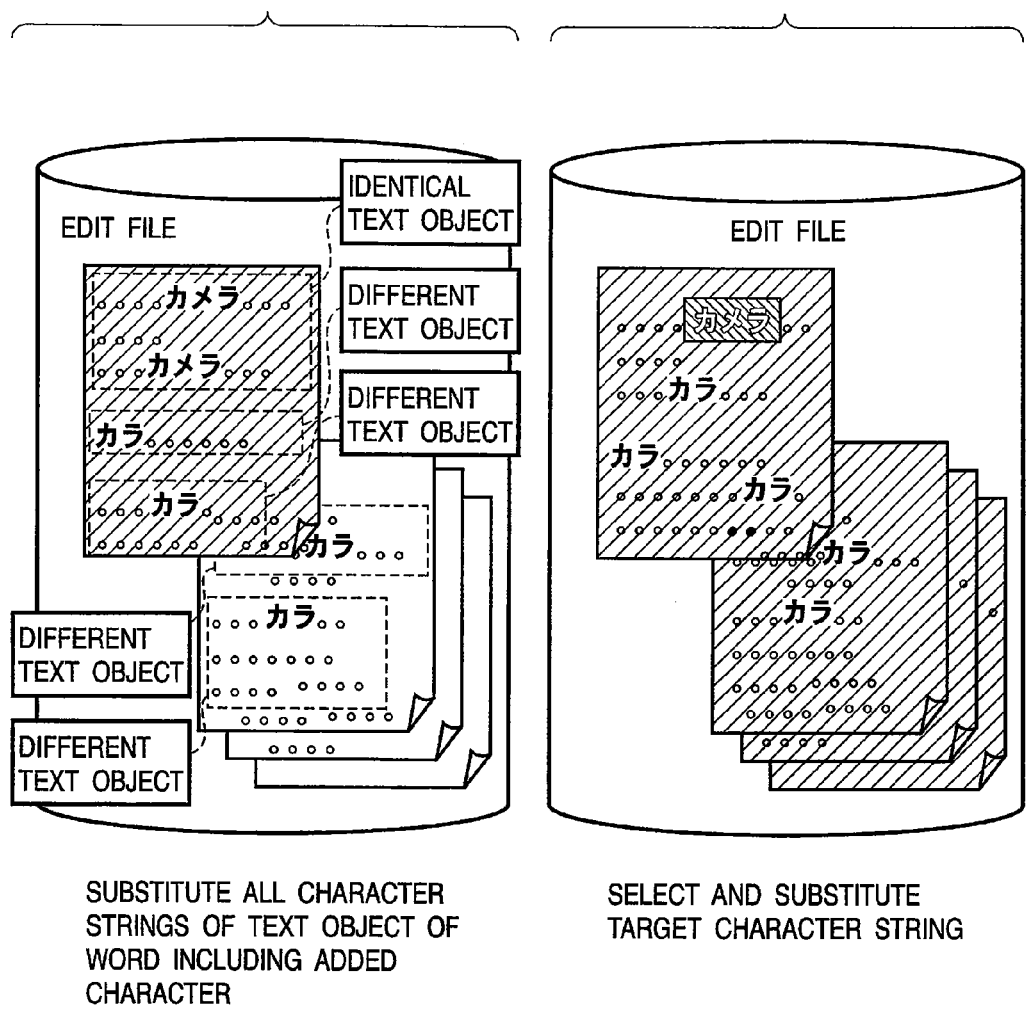
FIGS. 22A and 22B are views for explaining the concept of the processing contents according to the embodiment of the present invention.
Figure 24A:
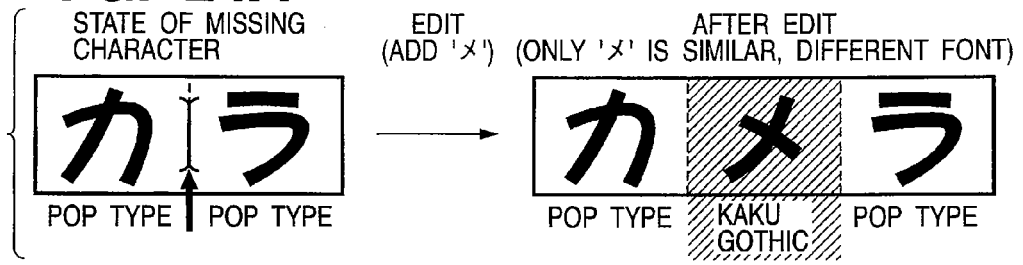
FIGS. 24A to 24F are views for explaining character edit examples.
Figure 24B:
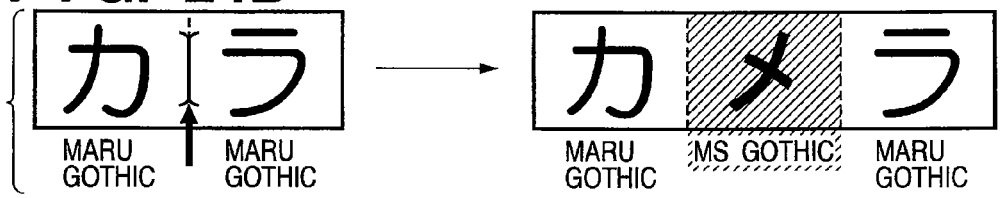
Figure 24C:
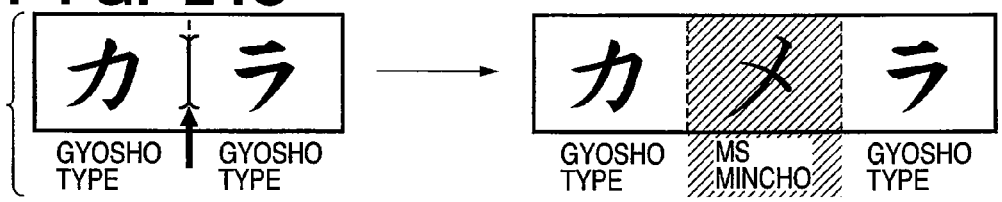
Figure 24D:
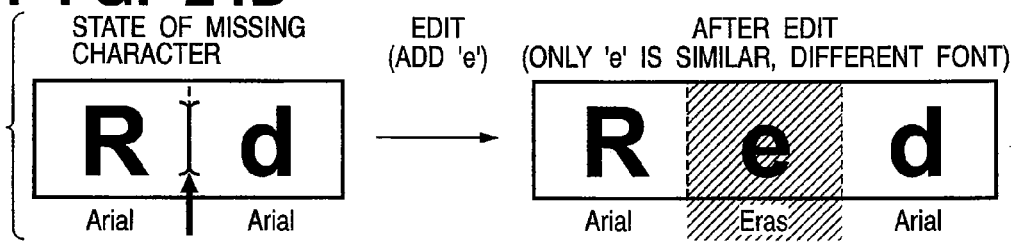
Figure 24E:
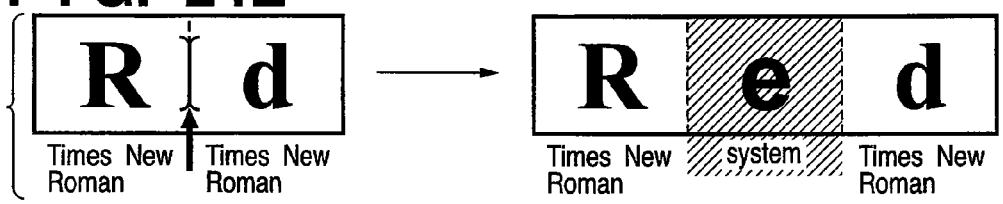
Figure 24F:
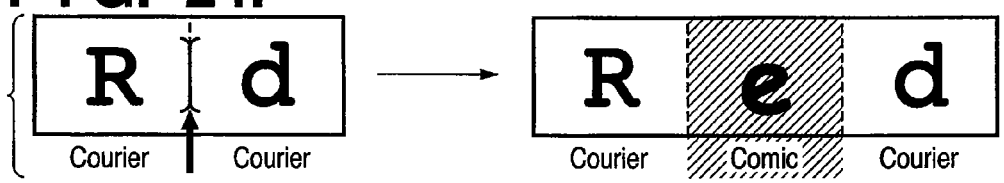
Figure 25:
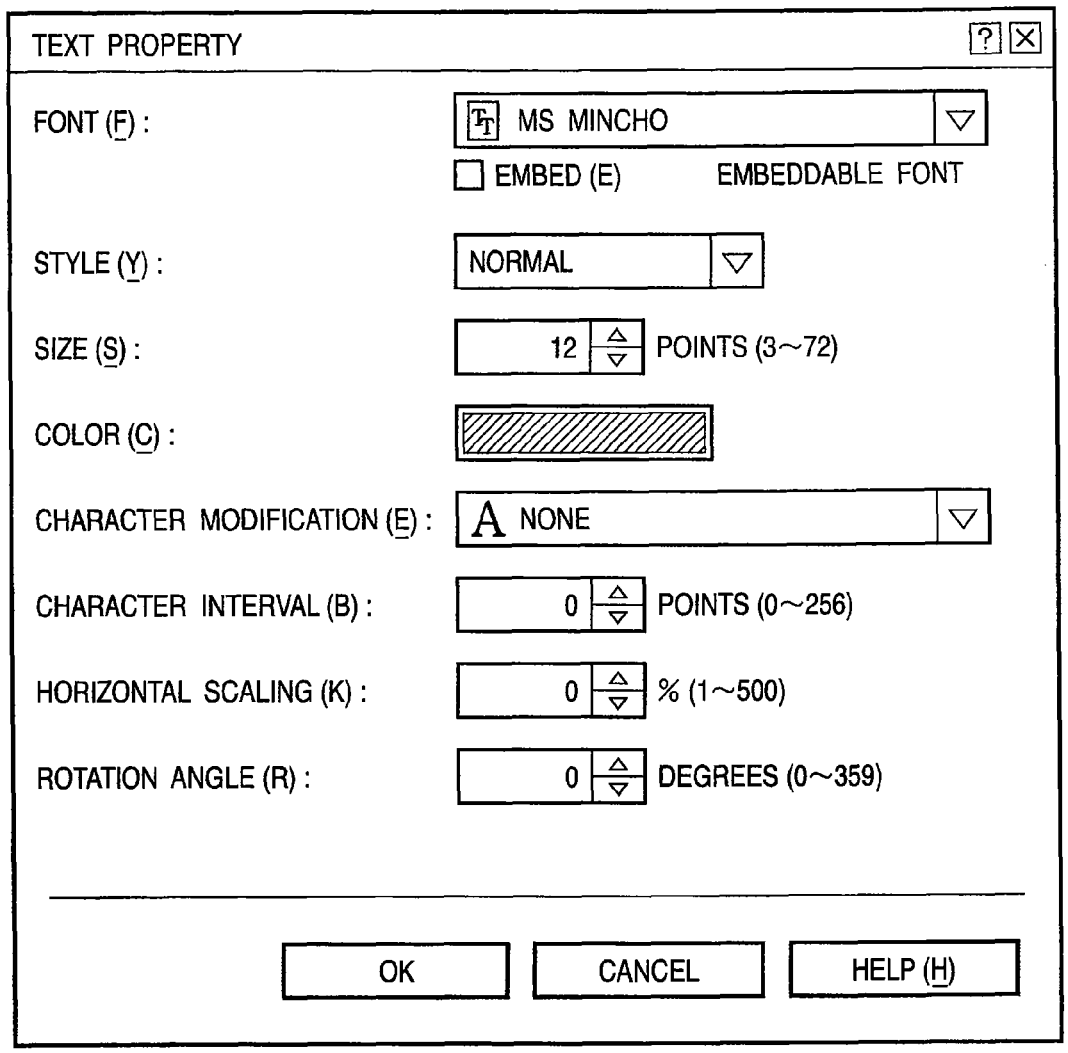
FIG. 25 shows an example of a dialog associated with character edit processing.
Figure 26A:
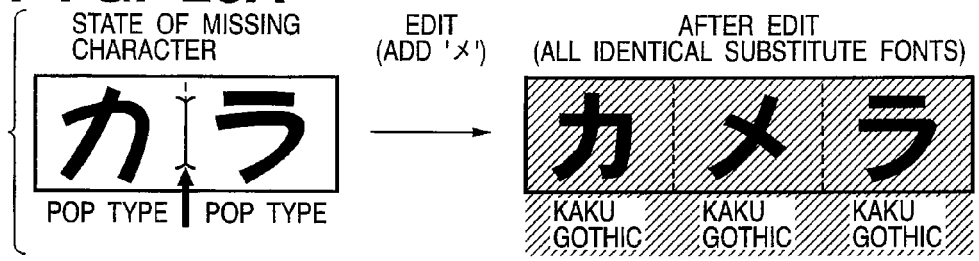
FIGS. 26A to 26F are views for explaining character edit examples.
Figure 26B:
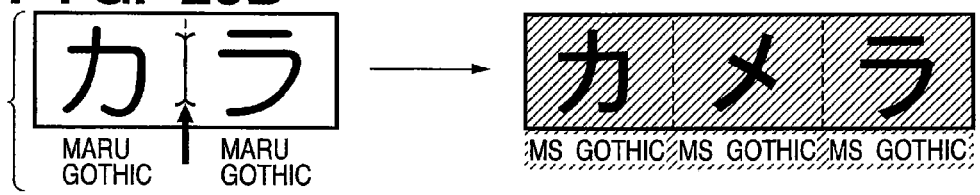
Figure 26C:
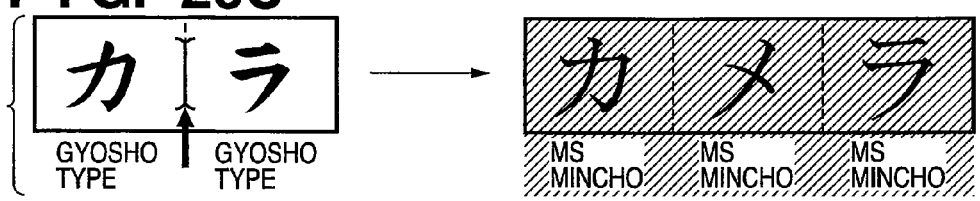
Figure 26D:
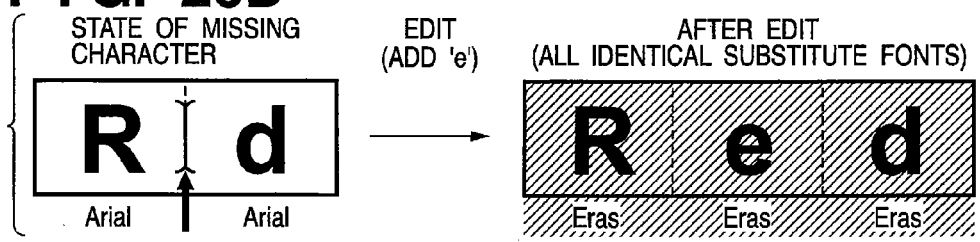
Figure 26E:
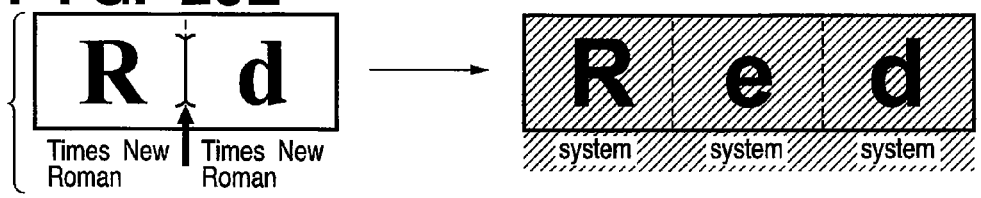
Figure 26F:
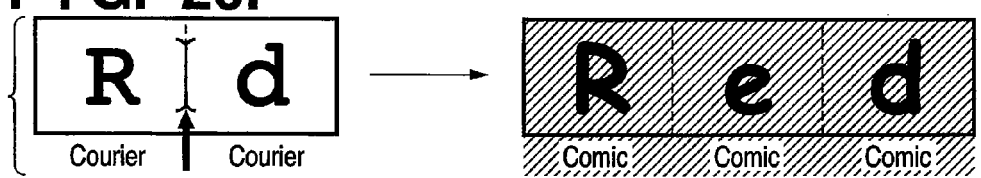

In FIG. 18A, and when the operator has selected the font substitute setting item 1701e "(E) substitute all character strings of text objects of word including added character" on the font substitute setting dialog 1700, the CPU 200 executes the following processing. That is, the CPU 200 recognizes "カメラ". as one word, and selects the character string "カメラ". as that which is to undergo substitute embedding, as shown in FIGS. 20A to 20C. Then, the CPU 200 selects not only the character string "カメラ". including the character "メ" at a position where the character is input, but also all text data in the same text object as that of the character "メ" at a position where the character is input the character as those which are to undergo substitute embedding, as shown in FIG. 22A.

In FIG. 18A, and when the operator has selected the font substitute setting item 1701f "(F) select and substitute target character string" on the font substitute setting dialog 1700, the CPU 200 executes the following processing. When the operator selects an arbitrary character string using a peripheral device, as shown in FIG. 22B, the CPU 200 recognizes the selected character string as one unit, and selects that character string as that which is to undergo substitute embedding.

The description will revert to FIG. 5E.

The CPU 200 embeds a substitute font for the target character using a font information embedding unit 1503 with reference to the input character substitute font table 1600 (FIG. 16) stored in the RAM 202 (step S3106). The CPU 200 then ends the processing.

As described above, according to this embodiment, upon executing the character edit work in a situation that a host does not store any font to be embedded, or the presence/absence of storage is unknown, the embedding processing of the font of interest can be automatically executed. In addition to this embedding processing, use settings of a printer font of interest, selection of an optimal substitute font, and embedding processing are automatically executed. In this way, the edit work and print work of a document can be efficiently done.

Since consistency associated with designation of a substitute font among a plurality of operators can be kept, the need for special knowledge and skills for the operator can be obviated. As a result, the degree of freedom in role assignment can be improved.

In the above embodiment, upon executing the font setting processing (when the font embed flag of the input character is ON), a dialog that notifies the user of the processing result of the finally executed processing is displayed as needed in terms of usability.

For example, upon searching for an embedded font for the input character, a dialog that displays the search result is preferably displayed. Upon searching for a substitute font, a dialog that displays the search result is preferably displayed.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-043161 filed on Feb. 20, 2006, which is hereby incorporated by reference herein in its entirety.

What is claimed is:

1. An information processing apparatus which sets typeface information used for an input character when the character is newly input in a character string in which typeface information is set for each character, comprising:
    an acquisition unit adapted to acquire typeface information of a first character and typeface information of a second character, which are located before and after a position of the input character;

a first setting unit adapted to, when the typeface information of the first character and the typeface information of the second character acquired by said acquisition unit include the same typeface type, set the typeface type as typeface type information used for the input character; and a second setting unit adapted to, when the typeface information of the first character and the typeface information of the second character acquired by said acquisition unit include different typeface, execute parsing for the character string including the input character, wherein said second setting unit,
  a) when it is parsed that the input character string is part of words including the first character, sets typeface information used for the input character to the same typeface information of the first character,
  b) when it is parsed that the input character string is part of words including the second character, sets typeface information used for the input character to the same typeface information of the second character.

2. The apparatus according to claim 1, further comprising:
a determination unit adapted to determine a status of a flag indicating the presence/absence of embedded typeface settings, which is included in each of the typeface information of the first character and the typeface information of the second character acquired by said acquisition unit; and an execution unit adapted to set the flag for the input character to be ON or OFF based on the determination result of said determination unit, and execute one of said first setting unit and said second setting unit.

3. The apparatus according to claim 2, wherein when the state of the flag included in at least one of the typeface information of the first character and the typeface information of the second character acquired by said acquisition unit is ON based on the determination result of said determination unit, said execution unit sets the flag for the input character to ON.

4. The apparatus according to claim 2, further comprising:
a processing setting unit adapted to set processing contents of typeface setting processing executed when the flag for the input character is set to ON; and a storage unit adapted to store processing setting information set by said processing setting unit in a storage medium, and in that said processing setting unit has, as setting items:
a first setting item used to search for typeface information including typeface information set for the input character;

a second setting item used to search for a printing device which is pre-installed with typeface information including typeface information set for the input character; and a third setting item used to search for substitute typeface information having substitute typeface information to the typeface information.

5. The apparatus according to claim 4, further comprising:
a typeface setting processing unit adapted to, when the flag for the input character is set to ON, execute the typeface setting processing based on the processing setting information stored in said storage unit.

6. The apparatus according to claim 5, wherein when the first setting item is set in the processing setting information, said typeface setting processing unit executes, based on the setting contents, at least one of:
first search processing for searching for typeface information including typeface information set in the input character from identical page data including the character string; and second search processing for searching for typeface information including typeface information set in the input character from identical file data including the character string.

7. The apparatus according to claim 5, wherein when the second setting item is set in the processing setting information, said typeface setting processing unit executes, based on the setting contents:
printing device acquisition processing for acquiring printing device information of a printing device which is usable by said information processing apparatus;

determination processing for determining whether or not the printing device information acquired by said printing device acquisition processing has printing device information having typeface information including typeface information set for the input character; and printing device setting processing for setting a printing device used to print the input character based on the determination result of the determination processing.

8. The apparatus according to claim 5, wherein when the third setting item is set in the processing setting information, said typeface setting processing unit executes, based on the setting contents:
reference processing for referring to a typeface table, which manages substitute typeface information including a typeface and a substitute typeface as a substitute for the typeface, based on the typeface information of the first character and the typeface information of the second character, which are located before and after the position of the input character;

selection processing for selecting the substitute typeface information from the substitute typeface information referred to by the reference processing; and specifying processing for specifying a character that uses the substitute typeface information selected by said selection processing, and said typeface setting processing unit settles the substitute typeface information selected by the selection processing as typeface information of the character specified by the specifying processing.

9. The apparatus according to claim 8, further comprising:
a substitute setting unit adapted to, when said typeface setting processing unit searches for the substitute typeface information, set a character that uses the retrieved substitute typeface information.

10. A method of controlling an information processing apparatus, which sets typeface information used for an input character when the character is newly input in a character string in which typeface information is set for each character, comprising:
an acquisition step of acquiring typeface information of a first character and typeface information of a second character, which are located before and after a position of the input character;

a first setting step of setting, when the typeface information of the first character and the typeface information of the second character acquired in the acquisition step include the same typeface, the typeface as typeface information used for the input character; and a second setting step of executing, when the typeface information of the first character and the typeface information of the second character acquired in the acquisition step include different typeface, parsing the character string including the input character, wherein said second setting step,
  a) when it is parsed that the input character string is part of words including the first character, sets typeface information used for the input character to the same typeface information of the first character, b) when it is parsed that the input character string is part of words including the second character, sets typeface information used for the input character to the same typeface information of the second character.

11. A computer program which is stored in a non-transitory computer-readable medium and makes a computer control an information processing apparatus, which sets typeface information used for an input character when the character is newly input in a character string in which lent typeface information is set for each character, said program characterized by making the computer execute: an acquisition step of acquiring typeface information of a first character and lent typeface information of a second character, which are located before and after a position of the input character; a first setting step of setting, when the typeface information of the first character and typeface information of the second character acquired in the acquisition step include the same typeface, the typeface as typeface information used for the input character; and a second setting step of executing, when the typeface information of the first character and the typeface information of the second character acquired in the acquisition step include different typeface, parsing the character string including the input character, wherein said second setting step, a) when it is parsed that the input character string is part of words including the first character, sets typeface information used for the input character to the same typeface information of the first character, b) when it is parsed that the input character string is part of words including the second character, sets typeface information used for the input character to the same typeface information of the second character.

12. The apparatus according to claim 1, further comprising
 a determination unit adapted to determine whether the same embedded typeface as that of the input character is available, and
 a selection unit adapted to, when it is determined by said determination unit that the same embedded typeface as that of the input character is available, select a substitute typeface, and
 a specifying unit adapted to specify a character in which the substitute typeface is to be embedded, by embedding the substitute typeface to the characters before and after the input character.

* * * * *